United States Patent
Otsuka

(10) Patent No.: US 11,847,784 B2
(45) Date of Patent: Dec. 19, 2023

(54) IMAGE PROCESSING APPARATUS, HEAD-MOUNTED DISPLAY, AND METHOD FOR ACQUIRING SPACE INFORMATION

(71) Applicant: Sony Interactive Entertainment Inc., Tokyo (JP)

(72) Inventor: Katsushi Otsuka, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 54 days.

(21) Appl. No.: 17/627,891

(22) PCT Filed: Aug. 24, 2020

(86) PCT No.: PCT/JP2020/031819
§ 371 (c)(1),
(2) Date: Jan. 18, 2022

(87) PCT Pub. No.: WO2021/049281
PCT Pub. Date: Mar. 18, 2021

(65) Prior Publication Data
US 2022/0254035 A1      Aug. 11, 2022

(30) Foreign Application Priority Data
Sep. 12, 2019   (JP) ................................ 2019-166087

(51) Int. Cl.
*G06V 10/44*      (2022.01)
*G06T 7/207*      (2017.01)
(Continued)

(52) U.S. Cl.
CPC ............ *G06T 7/207* (2017.01); *G06V 10/247* (2022.01); *G06V 10/431* (2022.01); *G06V 10/757* (2022.01)

(58) Field of Classification Search
CPC .... G06T 7/207; G06V 10/247; G06V 10/431; G06V 10/757; G06V 10/94; G06V 10/44; G01B 11/00
See application file for complete search history.

(56) References Cited

U.S. PATENT DOCUMENTS

2008/0304707 A1    12/2008  Oi
2012/0134576 A1*   5/2012   Sharma ................ G06V 10/507
                                                              382/206
(Continued)

FOREIGN PATENT DOCUMENTS

JP    2008304268 A    12/2008
JP    2014235600 A    12/2014
(Continued)

OTHER PUBLICATIONS

International Search Report for corresponding PCT Application No. PCT/JP2020/031819, 5 pages, dated Nov. 10, 2020.

*Primary Examiner* — Syed Haider
(74) *Attorney, Agent, or Firm* — Matthew B. Dernier, Esq.

(57) ABSTRACT

In an image processing apparatus, an image acquisition section acquires captured images from a stereo camera of a head-mounted display. An image correction section performs correction on a partial image-wise basis, a partial image being smaller than one frame, while referring to a displacement vector map representing displacement vectors of pixels required for the correction. A feature point extraction section extracts feature points from partial images, and supplies the feature points sequentially to a feature point comparison section. The feature point comparison section associates feature points in a plurality of images with one another. A space information acquisition section acquires
(Continued)

information as to a real space on the basis of correspondence information as to the feature points.

24 Claims, 11 Drawing Sheets

(51) Int. Cl.
*G06V 10/24* (2022.01)
*G06V 10/42* (2022.01)
*G06V 10/75* (2022.01)

(56) References Cited

U.S. PATENT DOCUMENTS

| | | | |
|---|---|---|---|
| 2012/0257016 A1* | 10/2012 | Nakajima | G06T 7/593 |
| | | | 348/46 |
| 2015/0278131 A1* | 10/2015 | Hesse | G06F 13/28 |
| | | | 710/308 |
| 2016/0260227 A1* | 9/2016 | Narita | G06T 7/248 |
| 2019/0005323 A1* | 1/2019 | Kimura | G06V 30/412 |
| 2019/0057276 A1 | 2/2019 | Tatsumi | |
| 2019/0130589 A1* | 5/2019 | Fu | G01B 11/2513 |
| 2019/0156502 A1 | 5/2019 | Lee | |
| 2019/0206135 A1 | 7/2019 | Jiang | |
| 2020/0366815 A1* | 11/2020 | Hasunuma | H04N 23/531 |

FOREIGN PATENT DOCUMENTS

| | | |
|---|---|---|
| JP | 2016075615 A | 5/2016 |
| JP | 2019036146 A | 3/2019 |
| JP | 2019086419 A | 6/2019 |
| JP | 2019096294 A | 6/2019 |
| JP | 2019121136 A | 7/2019 |

* cited by examiner

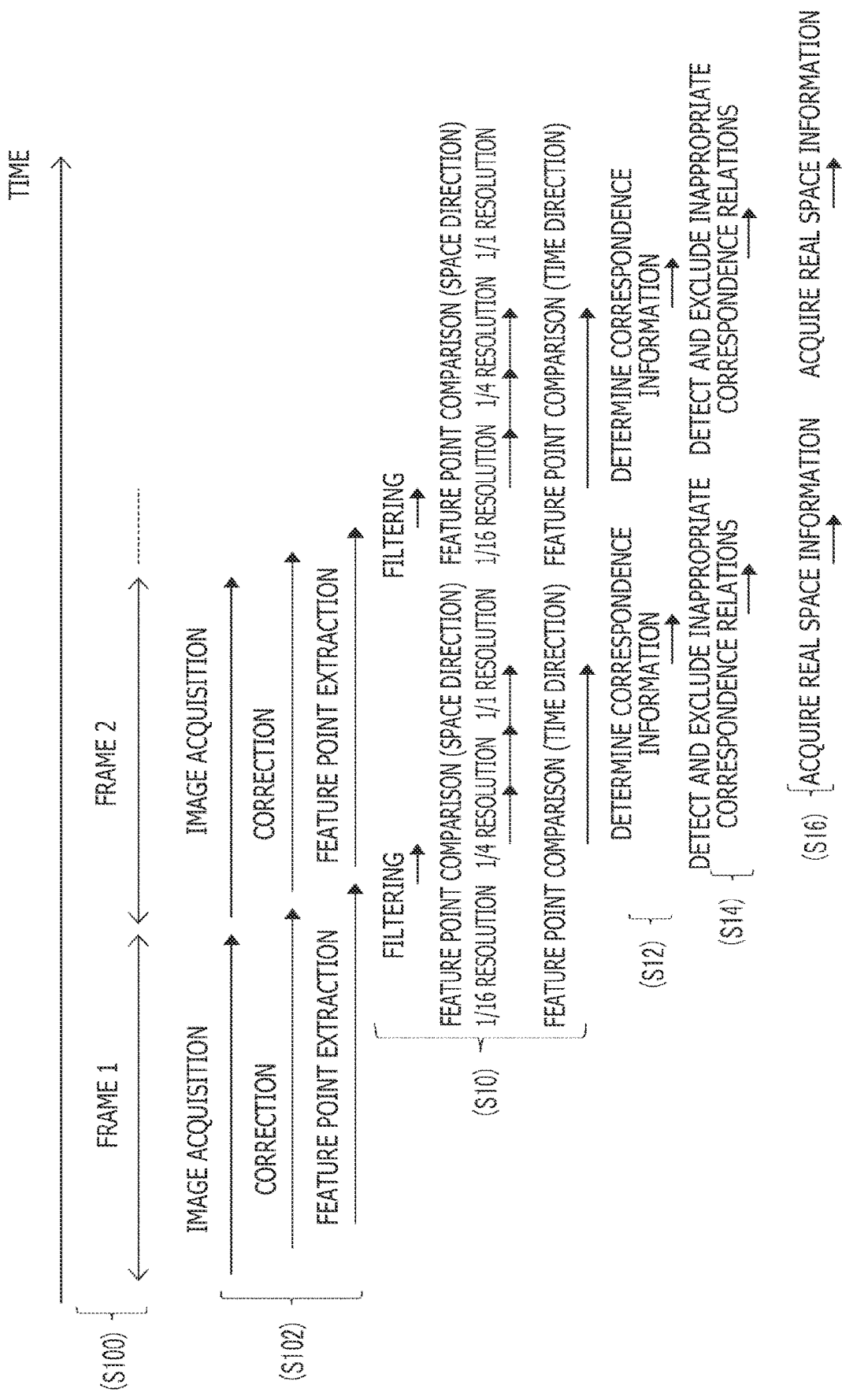

IMAGE PROCESSING APPARATUS, HEAD-MOUNTED DISPLAY, AND METHOD FOR ACQUIRING SPACE INFORMATION

TECHNICAL FIELD

This invention relates to an image processing apparatus that acquires real space information from captured images, a head-mounted display, and a method for acquiring space information.

BACKGROUND ART

Image display systems that make it possible to enjoy a target space from a free point of view have become widespread. For example, a system has been developed that displays a panoramic video on a head-mounted display so as to cause an image that matches the direction of a gaze of a user wearing the head-mounted display to be displayed. Use of the head-mounted display leads to an enhanced sense of immersion into the video, and improved operability of an application, such as a game. In addition, a walk-through system has been developed that enables a user wearing a head-mounted display to virtually walk around in a space displayed in a video form by moving physically.

To realize such a technology, it is necessary to cause images to be continuously displayed with the field of view changing in connection with motion of a head of the user wearing the head-mounted display. One conceivable method to accomplish this is to install a camera on the head-mounted display, and acquire the position and posture of the head-mounted display by analyzing images captured by the camera. A technique of analyzing captured images in real time to estimate a self-location and generate an environment map of a surrounding space has been applied in a wide variety of fields, such as fields of mobile devices, automobiles, robots, and unmanned aerial vehicles (see, for example, PTL 1).

PATENT LITERATURE

[PTL 1] JP 2008-304268A

SUMMARY

Technical Problems

Many of such techniques require accurate and instantaneous derivation of information, such as the self-location. Meanwhile, reductions in size, weight, and power consumption of an analysis apparatus are also required to extend the range of application. In the case where analysis is carried out inside the head-mounted display, for example, standpoints of the wearing feel for the user, continuous use time, and so on impose significant constraints on such parameters. Simplifying the analysis because of such constraints will pose a dilemma in terms of reduced accuracy of information to be obtained and reduced quality of user experience. The analysis apparatus may be provided separately from an apparatus, such as the head-mounted display, on which the camera is installed to obtain highly accurate information using sufficient resources, but this will require an increase in time required to exchange data between the apparatuses, and cause a tendency toward reduced responsiveness.

The present invention has been conceived in view of such problems, and an object thereof is to provide a technique for achieving acquisition of space information using captured images with a low delay and a low power consumption.

Solution to Problems

To solve the problems described above, a mode of the present invention concerns an image processing apparatus. The image processing apparatus includes a captured image acquisition section that acquires data of captured images from a camera; a feature point extraction section that extracts feature points of figures represented in the captured images; a feature point comparison section that associates feature points of the same figure in a plurality of captured images with each other; and a space information acquisition section that acquires information as to a real space including the camera on the basis of positional relations between the associated feature points in the captured images. The feature point extraction section extracts the feature points in each captured image on a partial image-wise basis, a partial image being smaller than a frame of the captured image, and supplies results thereof sequentially to the feature point comparison section.

Another mode of the present invention concerns a head-mounted display. The head-mounted display includes the above-described image processing apparatus; a camera that takes the captured images; and a panel that displays an image generated using the information as to the real space.

Yet another mode of the present invention concerns a method for acquiring space information. The method for acquiring space information includes steps performed by an image processing apparatus, and including a step of acquiring data of captured images from a camera; a step of extracting feature points of figures represented in the captured images; a step of associating feature points of the same figure in a plurality of captured images with each other; and a step of acquiring information as to a real space including the camera on the basis of positional relations between the associated feature points in the captured images. In the step of extracting the feature points, the feature points in each captured image are extracted on a partial image-wise basis, a partial image being smaller than a frame of the captured image, and results thereof are sequentially used in the associating step.

Note that any combinations of constituent elements described above, and a method, an apparatus, a system, a computer program, a data structure, a recording medium, and so on which have features of the present invention, are also effective as modes of the present invention.

Advantageous Effect of Invention

The present invention is able to achieve acquisition of space information using captured images with a low delay and a low power consumption.

BRIEF DESCRIPTION OF DRAWINGS

FIG. 12 is a diagram illustrating an example flow of a procedure, including processes performed by the space information acquisition section, performed on frames in the image processing apparatus according to the present embodiment.

DESCRIPTION OF EMBODIMENT

The present embodiment relates to a technique of analyzing images captured by a camera to acquire information as to at least one of the position, posture, and motion of a casing including the camera, an object in a real space including the camera, the position thereof, and so on. As long as this is satisfied, an object or device on which the camera is installed is not limited to any objects or devices, and may be any of a wearable display, such as a head-mounted display, a mobile device, an automobile, a robot, an unmanned aerial vehicle, and so on. In addition, an image processing apparatus that analyzes the captured images to obtain the information may be contained in the device on which the camera is installed, or may be provided separately from the device so as to be capable of communication connection with the device. Hereinafter, a mode in which the camera and the image processing apparatus are provided in a head-mounted display 100 will be mainly described.

Figure 1:
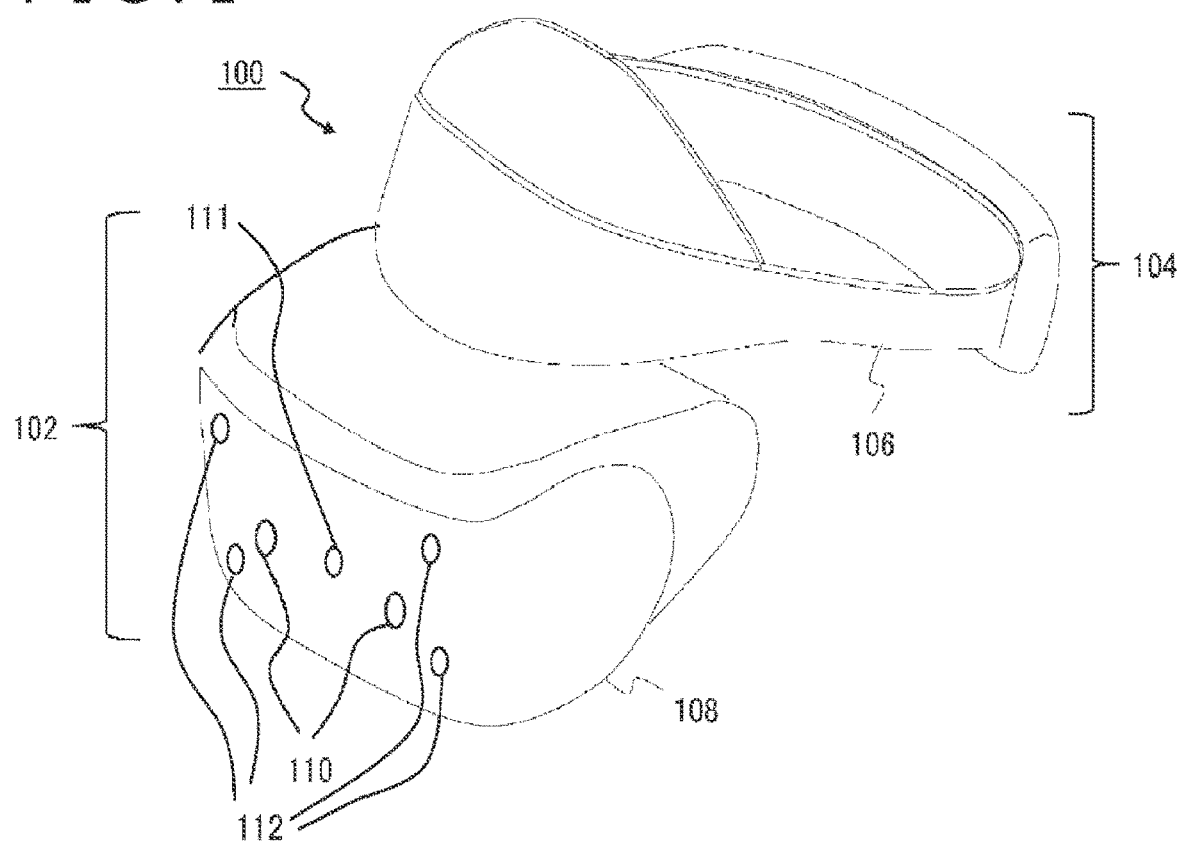
FIG. 1 is a diagram illustrating an appearance example of a head-mounted display according to an embodiment.

FIG. 1 illustrates an appearance example of the head-mounted display 100. In this example, the head-mounted display 100 includes an output mechanism unit 102 and a wearing mechanism unit 104. The wearing mechanism unit 104 includes a wearing band 106 to be worn by a user so as to extend around a head to achieve fixing of the device. The output mechanism unit 102 includes a casing 108 so shaped as to cover left and right eyes of the user when the head-mounted display 100 is worn by the user, and includes an internal display panel arranged to be opposite to the eyes when the head-mounted display 100 is worn by the user.

Inside the casing 108, an eyepiece is additionally provided which is positioned between the display panel and the eyes of the user when the head-mounted display 100 is worn by the user to enlarge an image viewed by the user. The head-mounted display 100 may further include a loudspeaker or an earphone at a position that will correspond to the position of an ear of the user when the head-mounted display 100 is worn by the user.

The head-mounted display 100 further includes, on a front face of the casing 108, a stereo camera 110, a monocular camera 111 having a wide viewing angle and disposed in a center, and four cameras 112 each having a wide viewing angle and disposed at upper left, upper right, lower left, and lower right corners, and captures a video of a real space that lies in a direction in which a face of the user faces. In a certain mode, the head-mounted display 100 provides a see-through mode in which a moving image captured by the stereo camera 110 is instantaneously displayed to enable the user to see the state of the real space as it is which lies in the direction in which the user faces.

In addition, the head-mounted display 100 further includes an image processing apparatus that analyzes images captured by at least one of the stereo camera 110, the monocular camera 111, and the four cameras 112 to acquire information as to at least one of the position and posture of the head-mounted display 100 itself, hence the position and posture of the head of the user, the presence, shape, and position of an object that lies in a surrounding space, and so on at a predetermined rate. Hereinafter, such information will be referred to collectively as "real space information."

SLAM (Simultaneous Localization and Mapping) is known as a technique for obtaining real space information by analyzing a sensing result, such as captured images. SLAM that uses captured images is a method of repeating a process of estimating the three-dimensional position of a real object from positional relations between figures of the same real object represented in images captured from a plurality of points of view, and a process of estimating the position and posture of a camera on the basis of the positions in the captured images of the figures of the real object, the position of which has been estimated, and thereby acquiring the position and posture of the camera while generating environment maps.

While it is assumed hereinafter that SLAM is employed to obtain the real space information, a specific algorithm is not limited to any particular algorithms as long as feature points are extracted from a plurality of captured images, and the real space information can be obtained by using correspondence relations between the feature points. The real space information obtained from the captured images in such a manner can be used to determine a field of view of an image to be displayed on the head-mounted display 100, or can be used to detect an approach to an object in a surrounding space and give a warning to the user. It will be understood by those skilled in the art that there are various other conceivable forms of information processing using the real space information.

In addition, the head-mounted display 100 may include an internal motion sensor for deriving the position, posture, and motion of the head-mounted display 100, such as an acceleration sensor, a gyro sensor, or a magnetometer. Values measured by the motion sensor can be used when the real space information is obtained in the image processing apparatus. Specifically, the measured values can be used for correction of captured images, association of feature points, and so on to achieve increased accuracy of such processes. In addition, the information as to the position and posture obtained from the captured images can be combined with extrapolation based on the values measured by the motion sensor to generate pieces of real space information with a frequency higher than the rate of image capturing.

Figure 2:
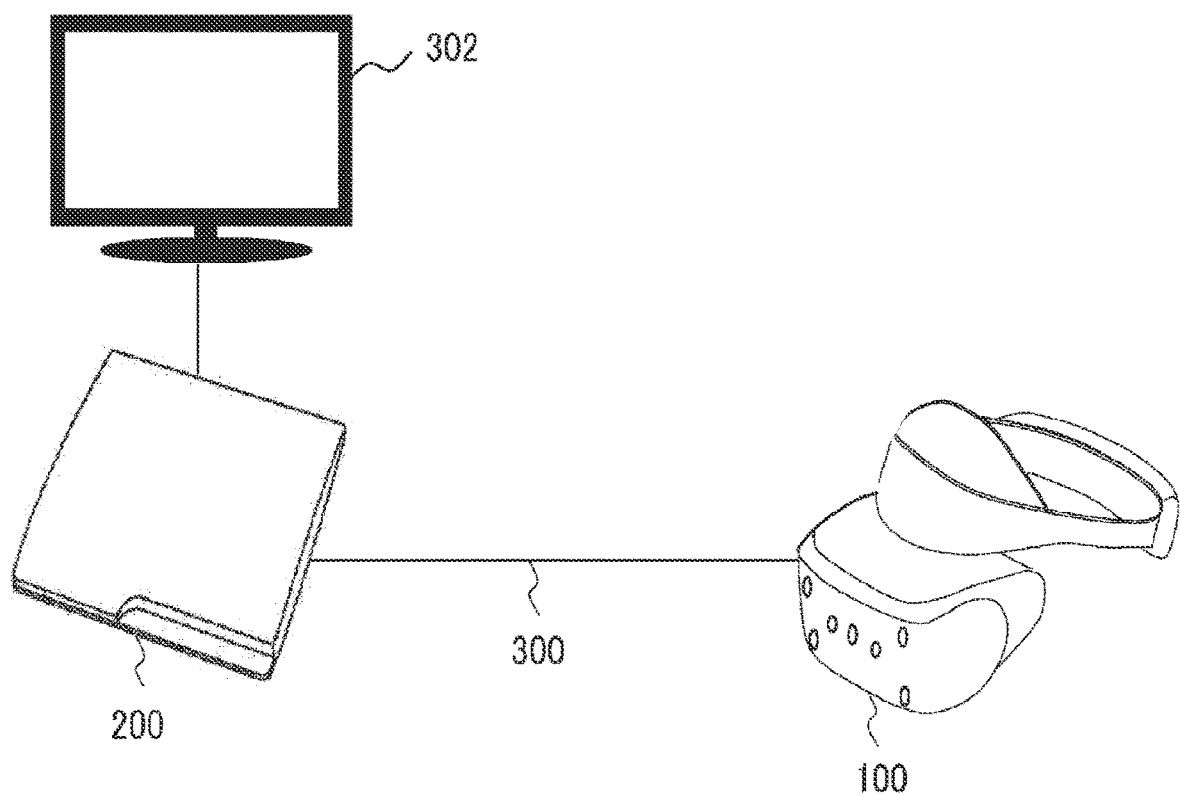
FIG. 2 is a diagram illustrating a configuration example of a content processing system to which the present embodiment is applicable.

FIG. 2 illustrates a configuration example of a content processing system to which the present embodiment is applicable. The head-mounted display 100 is connected to a content processing device 200 via wireless communication or an interface 300 for connection of a peripheral device compliant with USB (Universal Serial Bus) Type-C or the like. A flat-panel display 302 is connected to the content processing device 200. The content processing device 200 may be further connected to a server via a network. In this case, the server may provide an online application, such as a game in which a plurality of users can participate through the network, to the content processing device 200.

The content processing device 200 basically processes a program of a content, generates a display image, and transmits the display image to the head-mounted display 100 or the flat-panel display 302. Each of the head-mounted display 100 and the flat-panel display 302 receives data of the display image, and displays the display image as an image of the content. At this time, the content processing device 200 may acquire information as to the position and posture of the head-mounted display 100 from the head-mounted display 100 at a predetermined rate, identify the position of a point of view of the user and the direction of a gaze of the user on the basis of the acquired information, and generate and transmit a display image having a corresponding field of view.

Alternatively, the content processing device 200 may acquire, for example, information as to an object that lies around the user and the position and shape thereof from the head-mounted display 100, and generate and transmit an image in which a virtual object is depicted at a corresponding position. For example, the virtual object transmitted may be combined with an image captured by the stereo camera 110 and together displayed in the head-mounted display 100 to realize an augmented reality or a mixed reality.

Note that the purpose of use of the real space information acquired by the head-mounted display 100 is not limited to particular purposes. For example, the content processing device 200 may acquire a motion of the head-mounted display 100 as a gesture of the user to cause a computerized game to progress according to the gesture. At any rate, the acquisition of the real space information inside the head-mounted display 100 contributes to making the size of data to be transmitted to the content processing device 200 significantly smaller than in the case where captured images are transmitted therefrom.

Note that the configuration of the content processing system illustrated in the figure is merely an example, and that, for example, the flat-panel display 302 may not be included therein. Also note that at least some functions of the content processing device 200 may be implemented in the head-mounted display 100. Further, as suggested above, the function of acquiring the real space information may be implemented in the content processing device 200.

In addition, the distance and mode of communication between the content processing device 200 and the head-mounted display 100 are not limited. For example, the content processing device 200 may be a game apparatus or the like possessed by an individual, a server of a business corporation or the like that provides any of various types of delivery services, such as a cloud game, a home server that transmits data to any terminal, or the like. Accordingly, the communication between the content processing device 200 and the head-mounted display 100 may be implemented not by the above-mentioned example means but via any network or access point, such as a public network, e.g., the Internet, a LAN (Local Area Network), a mobile phone carrier network, a Wi-Fi (Wireless Fidelity) spot in town, or a Wi-Fi access point in the home.

Figure 3:
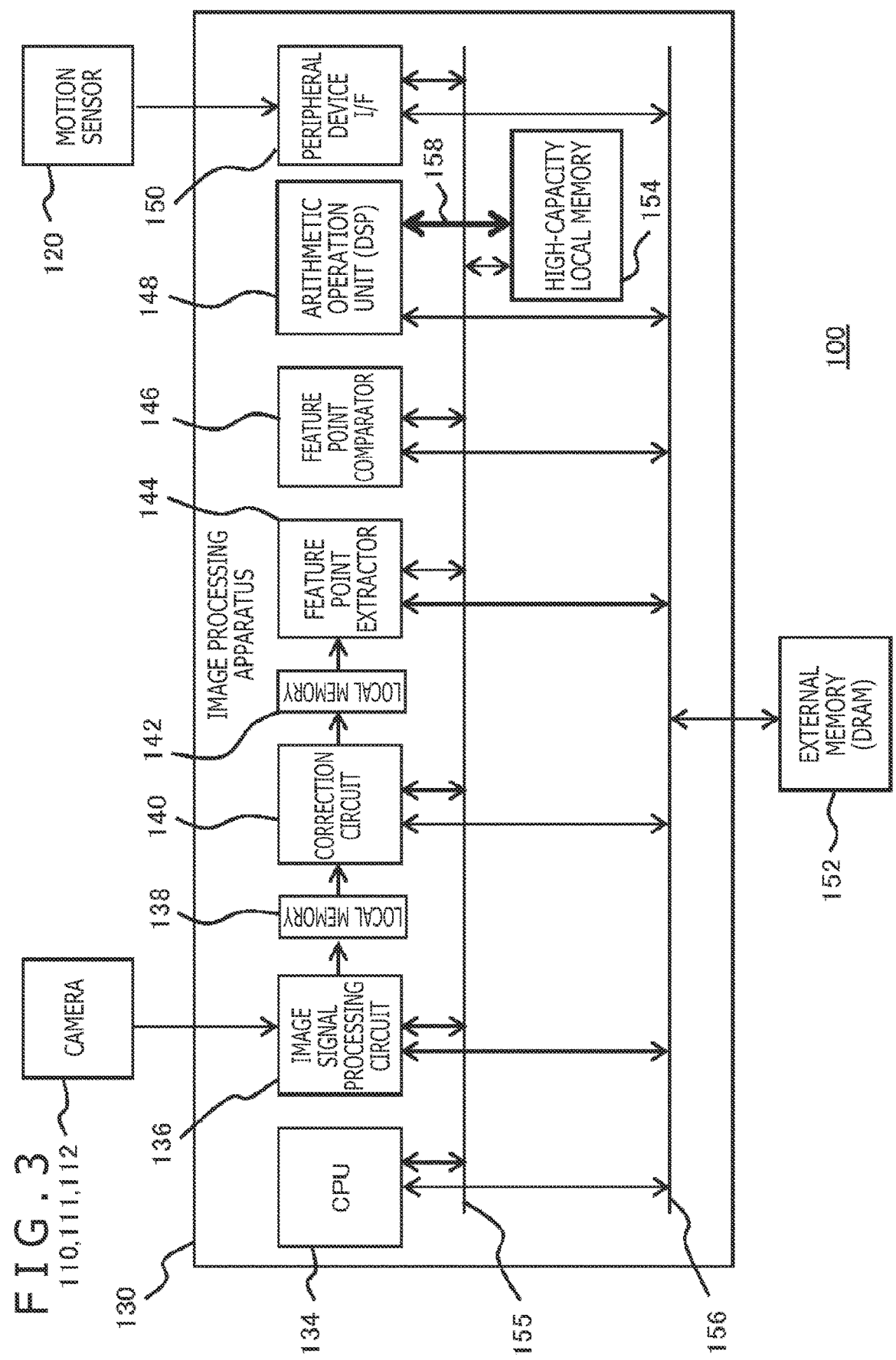
FIG. 3 is a diagram illustrating a configuration of circuitry used to acquire real space information within internal circuitry of the head-mounted display according to the present embodiment.

FIG. 3 illustrates the configuration of circuitry used to acquire the real space information within internal circuitry of the head-mounted display 100 according to the present embodiment. As described above, the head-mounted display 100 includes the stereo camera 110, the monocular camera 111, the four cameras 112, a motion sensor 120, an image processing apparatus 130 that acquires the real space information from the captured images, and an external memory 152. Note that the image processing apparatus 130 can be implemented as a system on a chip on which various functional modules, including a CPU (Central Processing Unit), are mounted.

Although the number of cameras used for acquisition of a real space is not limited to particular values in the present embodiment, a case in which images captured by the stereo camera 110 are used will be described below for the sake of simplicity. The image processing apparatus 130 is an integrated circuit used for image processing. In this, a CPU 134 is a main processor that processes and outputs signals, such as image signals and sensor signals, instructions, and data, and controls other parts of the circuit. An image signal processing circuit 136, which is synonymous with an ISP (Image Signal Processor), acquires pieces of data of captured images from image sensors of the stereo camera 110 at a predetermined rate, and performs a necessary process, such as a demosaicing process, on each of the pieces of data.

Here, the image signal processing circuit 136 acquires data of pixel lines of a pair of frames captured with the same timing by the stereo camera 110 in parallel in a scanning sequence, and performs the necessary process thereon. At this time, the image signal processing circuit 136 may additionally perform a process of separating an intensity image of light that is used to acquire the real space information, and an intensity image of light that is used for another purpose, when lights of a plurality of wavelength ranges are detected by the image sensors of the camera.

The image signal processing circuit 136 stores data of each captured image in a local memory 138 such that pieces of data of pixel lines are stored in an order in which pixel values thereof have been determined. The local memory 138 is implemented by an SRAM (Static Random Access Memory) or the like, and has storage regions for storing data of partial images each of which is smaller than one frame, each storage region being provided for a separate one of a plurality of captured images used in processing. For example, when images captured by the stereo camera 110 are to be processed, the local memory 138 has two storage regions for storing data of partial images.

A correction circuit 140 performs a necessary correction process on each of the partial images stored in the local memory 138. Specifically, the correction circuit 140 removes image distortion caused by lenses of the stereo camera 110, and performs rectification to make epipolar lines parallel to each other. The correction circuit 140 stores resulting data in a local memory 142 such that pieces of data of pixel lines are stored in an order in which corrected pixel values thereof have been determined.

Similarly to the local memory 138, the local memory 142 has storage regions for storing data of the partial images each of which is smaller than one frame, each storage region being provided for a separate one of the plurality of captured images. A feature point extractor 144 extracts feature points from the corrected partial images stored in the local memory 142, and acquires position coordinates thereof. There are various algorithms for extracting feature points, and any of such algorithms may be used in the present embodiment. The feature point extractor 144 stores, as position information as to the feature points, data representing the extracted feature points on an image plane in a high-capacity local memory 154.

As illustrated in the figure, in the present embodiment, the image signal processing circuit 136, the correction circuit 140, and the feature point extractor 144 are connected in series via the local memories 138 and 142. A feature point comparator 146 reads the position information as to the feature points extracted by the feature point extractor 144 from the high-capacity local memory 154, and associates feature points representing the same point on the same subject with each other. At this time, the feature point comparator 146 performs association in a space direction between a plurality of images captured by different cameras, and association in a time direction between images captured at different times by the same camera.

Note that, once position information as to a feature point in a region, i.e., a search range, required for comparison in each captured image is stored in the high-capacity local memory 154, the feature point comparator 146 may start an association using this position information. The feature point comparator 146 stores a result of the association in the high-capacity local memory 154. An arithmetic operation unit 148 is implemented by a DSP (Digital Signal Processor), and acquires the real space information through a predetermined algorithm, such as SLAM, on the basis of correspondence information as to the feature points stored in the high-capacity local memory 154.

The arithmetic operation unit 148 may further read the position information as to the feature points extracted by the feature point extractor 144 from the high-capacity local memory 154, and perform a process similar to the process performed by the feature point comparator 146. When entities that perform the process of associating the feature points with one another are thus doubly provided, increased efficiency of processing and increased accuracy of comparison without an increased processing time can be achieved. The arithmetic operation unit 148 stores the acquired real space information in the high-capacity local memory 154 and/or the external memory 152 such that the real space information can be transmitted to the content processing device 200 as necessary. A peripheral device interface 150 acquires, from the motion sensor 120, values measured thereby at a predetermined rate, and stores the measured values in the high-capacity local memory 154.

The high-capacity local memory 154 is implemented by an SRAM (Static Random Access Memory) or the like, and stores the position information as to the feature points extracted by the feature point extractor 144, the correspondence information as to the feature points acquired by the feature point comparator 146, intermediate data acquired by the arithmetic operation unit 148 during SLAM processing, the real space information obtained as a result of the processing, and so on. The external memory 152 is implemented by a DRAM (Dynamic Random Access Memory), and stores a program that defines an operation of the CPU 134, various types of data necessary for processing, the real space information obtained as a result of SLAM, and so on.

As illustrated in the figure, in the present embodiment, the image signal processing circuit, the correction circuit, the feature point extractor, the feature point comparator, and the arithmetic operation unit, which are dedicated to their respective processes, are provided. In addition, each of the image signal processing circuit, the correction circuit, the feature point extractor, and the feature point comparator causes its process to progress on a partial image-wise basis without waiting for a process on one frame to be finished in the previous stage. This configuration enables the steps from the acquisition of the pixel values to the acquisition of the real space information to be accomplished at a high speed.

In addition, the processing on the partial image-wise basis reduces the need for writing and reading to and from a memory that stores data of one frame, and enables a low-capacity fast-access memory, such as an SRAM, to be used as a storage destination in which intermediate data is temporarily stored. This makes it easy to provide such a memory in the vicinity of each circuit, providing advantages in terms of wiring and power consumption. Furthermore, as illustrated in the figure, the image processing apparatus 130 according to the present embodiment includes a dedicated bus 155 used for exchange of data between each circuit and the high-capacity local memory 154 in addition to a bus 156 used for exchange of data between each circuit and the external memory 152.

This enables data to be exchanged regardless of the state of use of the main bus 156 to cause the processing for the real space information to progress. A reduction in the frequency of use of each of the main bus 156 and the external memory 152, which are shared by other processes, leads to reductions in transfer delay and power consumption. Note that, in practice, the bus 155 may have any of structures that have been put to practical use, such as multilayer-type, crossbar-type, and tree-type structures.

Further, in the image processing apparatus 130 according to the present embodiment, a dedicated interface 158 that has low-delay and broadband features is provided between the arithmetic operation unit 148 and the high-capacity local memory 154 for direct connection therebetween. This enables exchange of data between the arithmetic operation unit 148 and the high-capacity local memory 154, which occurs with a relatively high frequency during processes, such as self-location estimation and environment map generation, in SLAM, to be performed in one step independently of access to the high-capacity local memory 154 by other parts of the circuitry.

Figure 4:
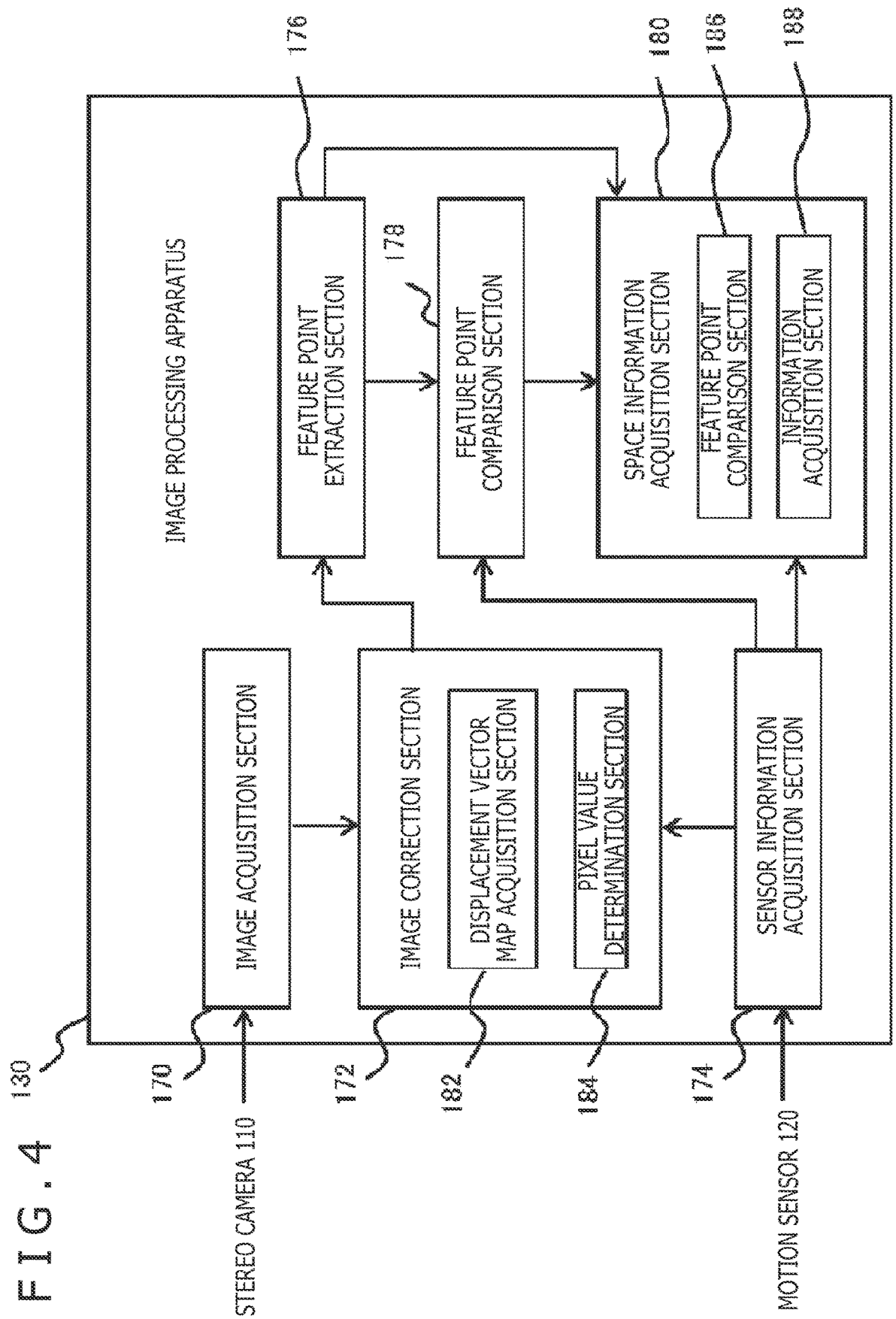
FIG. 4 is a diagram illustrating a configuration of functional blocks of an image processing apparatus according to the present embodiment.

FIG. 4 illustrates the configuration of functional blocks of the image processing apparatus 130 according to the present embodiment. The functional blocks illustrated in this figure can be implemented in hardware by the CPU, the various circuits, the arithmetic operation unit, the various memories, and so on illustrated in FIG. 3, and can be implemented in software by a program that is loaded from a recording medium and which exercises various functions, such as an information processing function, an image analysis function, and a data input/output function. Therefore, it will be understood by those skilled in the art that these functional blocks can be implemented in various forms in hardware alone, in software alone, or in a combination of hardware and software, and the functional blocks may be implemented in any of such forms.

The image processing apparatus 130 includes an image acquisition section 170 that acquires the data of the captured images, an image correction section 172 that corrects the captured images, a sensor information acquisition section 174 that acquires the values measured by the motion sensor 120, a feature point extraction section 176 that extracts the feature points from the captured images, a feature point comparison section 178 that acquires the correspondence relations between the feature points in the plurality of captured images, and a space information acquisition section 180 that acquires the real space information on the basis of the correspondence relations between the feature points.

The image acquisition section 170 is implemented by the CPU 134, the image signal processing circuit 136, and the local memory 138 in FIG. 3, and acquires the data of the captured images from the stereo camera 110. As suggested above, the image acquisition section 170 acquires pieces of data of pixel values in an order in which pixel lines are outputted from the image sensors of the stereo camera 110, performs predetermined processes thereon on the partial image-wise basis, each partial image being smaller than the frame of the captured image, and supplies results thereof sequentially to the image correction section 172. Here, the image acquisition section 170 performs necessary processes, such as black level correction, defect correction, a demosaicing process, a smoothing process, noise reduction, and cropping, on the acquired images. Note that correction of removing camera lens distortion may not be performed.

In addition, in the case where the data outputted from the image sensors includes, as pixel values, intensities of lights of a plurality of wavelength ranges, the image acquisition section 170 may separate the data according to a plurality of purposes including acquisition of information as to a real space, thereby generating pieces of data of a plurality of captured images each having intensities of a light of a predetermined wavelength range as pixel values. For example, in the case of image sensors in which pixels for detecting grayscale intensity and pixels for detecting the intensity of infrared rays coexist, the image acquisition section 170 separates the data into a grayscale image and an infrared image, and uses the former to acquire the real space information. In this case, the image acquisition section 170 starts the separating process at a time when a pixel line or lines in a range required to determine a pixel line corresponding to one line of the separated images have been acquired. The configuration of the image acquisition section 170 in this case will be described below.

The image correction section 172 is implemented by the CPU 134, the correction circuit 140, and the local memory 142 in FIG. 3, and performs corrections necessary for extraction and association of the feature points in subsequent stages on the partial image-wise basis each time data of a partial image is acquired by the image acquisition section 170. Specifically, the image correction section 172 performs correction of removing distortion caused by the camera lenses and rectification of images captured at the same time by the stereo camera 110.

The rectification is a process of performing paralleling of aligning epipolar lines of images captured by a plurality of cameras having nonparallel optical axes with the same horizontal level to limit a range to search for a corresponding point onto the horizontal line (see, for example, JP 2004-258266A). In more detail, the image correction section 172 includes a displacement vector map acquisition section 182 and a pixel value determination section 184. The displacement vector map acquisition section 182 acquires a displacement vector map representing, on an image plane, displacement vectors each representing the amount and direction of displacement of a pixel required for correction.

That is, the displacement vector map acquisition section 182 calculates a position to which each of the pixels in an image before correction will be displaced in an image after correction, and represents, on the image plane, a displacement vector having the position in the former image as a starting point and the position in the latter image as an ending point. At this time, a displacement vector required for the correction of removing the distortion caused by the camera lens and a displacement vector required for the rectification can be calculated and combined together to generate a single displacement vector representing displacements for the two types of corrections. In addition, because advance calculation is possible for these corrections, in practice, the displacement vector map acquisition section 182 may only need to read out the displacement vector map held therein.

In the case where the captured images are expressed in three primary colors of red, green, and blue, chromatic aberration occurs because the camera lenses have different refractive indices for the respective wavelength ranges thereof. Accordingly, a different displacement vector map may be prepared for each of the primary colors expressed by the captured images, and the displacement vector map acquisition section 182 may read out the displacement vector maps thus prepared. The pixel value determination section 184 refers to the displacement vector map, derives a displacement destination of each of the pixels included in the partial image acquired from the image acquisition section 170, and generates a corrected partial image by determining the pixel value of the displacement destination to be the pixel value of the starting point of the displacement.

Because of the displacement vector map, the pixel value determination section 184 is able to accomplish both the correction of removing the lens distortion and the rectification at the same time for each of the pixels independently. A corrected image that can be generated from a partial image before correction can change in area. The pixel value determination section 184 starts the correction process with reference to the displacement vector map at a time when data of a partial image before correction in a range required to generate data of a corrected partial image has been acquired. Thus, corrected images can also be processed on the partial image-wise basis.

In the case where the captured image is expressed in the three primary colors of red, green, and blue, the pixel value determination section 184 corrects each of the primary color elements represented by the captured image using a different one of the displacement vector maps. The pixel value determination section 184 stores the data of the corrected partial images in the local memory 142 in the order in which the pixel values thereof have been determined, thereby supplying the data to the feature point extraction section 176 sequentially.

Note that, in the case where rolling shutters are adopted in the stereo camera 110, the pixel value determination section 184 may, at the same time, also perform correction of eliminating image distortion caused by differences in capturing time within a frame. The rolling shutter is a type of shutter that performs exposures sequentially from a top row of an image, and naturally causes delays in capturing time to pixel lines in lower rows. Accordingly, a figure can be distorted depending on motion of the stereo camera 110 during a period in which one frame is captured.

Thus, the displacement vector map acquisition section 182 acquires the motion of the stereo camera 110 on the basis of the values measured by the motion sensor 120 of the head-mounted display 100, and calculates the amount of distortion of a figure caused by the motion. Then, the displacement vector map acquisition section 182 derives a displacement vector for eliminating this amount of distortion, and combines this displacement vector with the displacement vector for removing the distortion due to the lens and the rectification prepared in advance. In this case, the displacement vector map is updated at a predetermined rate by the displacement vector map acquisition section 182.

Then, the pixel value determination section 184 performs the correction with reference to the latest displacement vector map.

The sensor information acquisition section 174 is implemented by the CPU 134, the peripheral device interface 150, and the high-capacity local memory 154 in FIG. 3, and acquires the measured values from the motion sensor 120 at the predetermined rate, and supplies the measured values to the image correction section 172, the feature point comparison section 178, and the space information acquisition section 180 as appropriate. In the image correction section 172, the supplied measured values are used for the above-mentioned correction of the distortion due to the rolling shutter. In the feature point comparison section 178, the measured values are used to determine the search range through prediction of motion of a feature point. In the space information acquisition section 180, the measured values are integrated into the real space information obtained through SLAM to achieve sensor fusion.

The feature point extraction section 176 is implemented by the CPU 134, the feature point extractor 144, and the high-capacity local memory 154 in FIG. 3, and acquires the data of the images corrected by the image correction section 172 on the partial image-wise basis. Then, the feature point extraction section 176 extracts the feature points on this basis, and supplies results thereof to the feature point comparison section 178. There are various algorithms for extracting feature points in images, and the feature point extraction section 176 may adopt any of such algorithms. The feature point extraction section 176, for example, employs a Harris corner detection algorithm to extract the feature points.

This algorithm itself is a common algorithm published at, for example, cv2.cornerHarris( ) in OpenCV, which is an open source library. Specifically, changes of pixel values according to movement of pixel positions are derived, and regions in which large changes are observed in all directions are detected as corners. This process basically allows assessment to be performed only within a region near a target pixel, and therefore allows feature points to be extracted independently on the partial image-wise basis. Therefore, at a time when a partial image in a range required to extract one feature point has been acquired, the feature point extraction section 176 may start the process of extracting the feature point.

The feature point comparison section 178 is implemented by the CPU 134, the feature point comparator 146, and the high-capacity local memory 154 in FIG. 3, and associates feature points of the same figure in a plurality of captured images with each other. For example, the feature point comparison section 178 performs template matching in which a region of a predetermined size is set as a template image in one of images between which the association is to be performed, and a region having a high degree of similarity thereto is searched for in the other image to detect a corresponding feature point.

There are various algorithms for associating feature points in a plurality of images with each other, and the feature point comparison section 178 may adopt any of such algorithms. For example, the feature point comparison section 178 employs ZNCC (Zero means Normalized Cross Correlation) to associate the feature points with one another. ZNCC is one method of template matching, and evaluates the degree of similarity using statistics called zero-mean normalized cross-correlation. On the assumption that I(x, y) denotes pixel values of an image to be searched and T(x, y) denotes pixel values of the template image, the value of ZNCC in a search window having an upper left vertex at position coordinates (dx, dy) is calculated as follows.

$$ZNCC(dx, dy) = \frac{\sum_{x=0}^{w-1}\sum_{y=0}^{h-1}(I(dx+x, dy+y) - I_{ave})(T(x,y) - T_{ave})}{\sqrt{\sum_{x=0}^{w-1}\sum_{y=0}^{h-1}(I(dx+x, dy+y) - I_{ave})^2}\sqrt{\sum_{x=0}^{w-1}\sum_{y=0}^{h-1}(T(x,y) - T_{ave})^2}}$$ [Math. 1]

Here, (w, h) denotes the width and height of the template image, $T_{ave}$ denotes an average of the pixel values of the template image, and $I_{ave}$ denotes an average of pixel values of the search window. The feature point comparison section 178 detects a search window that has the greatest value of ZNCC to identify a corresponding feature point. ZNCC is not affected by a difference between the intensity ranges of the images compared with each other, and therefore has a high robustness against changes in brightness and so on. Using such pattern matching, the feature point comparison section 178 performs one of or both the association of feature points in a plurality of images captured at the same time by a plurality of cameras and the association of feature points in a plurality of frames of a moving image captured by the same camera.

At this time, the feature point comparison section 178 may start a search for the corresponding feature point at a time when data of a feature point in a search range in the image to be searched has been obtained. When the image correction section 172 has performed the rectification, the search range can be limited to a horizontal direction in the association in the space direction. In addition, an upper limit of a parallax in the horizontal direction is substantially determined by a distance between the lenses of the stereo camera 110. Therefore, the search range can be set in a limited manner by the feature point comparison section 178.

In the association in the time direction, a range in which each feature point moves depends on the motion of the stereo camera 110, hence motion of the user. Accordingly, the feature point comparison section 178 may reduce the image to be processed in which feature points are represented, thereby generating a plurality of images having different resolutions, and search the image having the lowest resolution first followed by the image or images having increasingly higher resolutions, thereby limiting the search range in the image having higher resolutions. In addition, the feature point comparison section 178 may limit the search range by predicting motion of the feature point that matches the motion of the stereo camera 110 on the basis of the values measured by the motion sensor 120.

The feature point comparison section 178 may further calculate the distance of a subject using a result of the association in the space direction. A method of calculating the distance of a subject using the principles of triangulation from the amount of horizontal displacement of a feature point between a pair of images captured by the stereo camera 110 is widely known. The feature point comparison section 178 stores the acquired correspondence information as to the feature points and information as to the distance sequentially in the high-capacity local memory 154.

The space information acquisition section 180 is implemented by the CPU 134, the arithmetic operation unit 148, and the high-capacity local memory 154 in FIG. 3, and acquires the real space information through the algorithm, such as SLAM, on the basis of positional relations between the associated feature points in the captured images. For example, an extended Kalman filter or the like may be additionally used to estimate the latest posture and position of the point of view of the camera from the associated feature points and thus acquire the real space information.

At this time, the space information acquisition section 180 reads out the correspondence information as to the feature points and the information as to the distance stored in the high-capacity local memory 154 at a high speed via the dedicated interface 158. In addition, the space information acquisition section 180 uses the dedicated interface 158 to, for example, write and read intermediate data to and from the high-capacity local memory 154, and write the real space information finally obtained to the high-capacity local memory 154 at high speeds.

The space information acquisition section 180 includes a feature point comparison section 186 and an information acquisition section 188. The feature point comparison section 186 associates feature points of the same figure in a plurality of captured images with each other. That is, the feature point comparison section 186 acquires information similar to the information acquired by the feature point comparison section 178. In the present embodiment, various modes as listed below are implemented through the implementation of the space information acquisition section 180 via the arithmetic operation unit 148.

1. The association is performed through ZNCC by only one of the feature point comparison sections 178 and 186.
2. The association through ZNCC is performed by both of the feature point comparison sections 178 and 186, while processes are divided therebetween in terms of the images to be processed and/or the direction (space or time) to achieve increased parallelism of the processes.
3. Both of the feature point comparison sections 178 and 186 perform the association through ZNCC between the same images while an additional process and/or an irregular process is performed in the feature point comparison section 186, and when results thereof, which are compared with each other, have a difference therebetween, the better result is adopted.
4. The feature point comparison sections 178 and 186 perform the association between the same images employing ZNCC and another method, and the better one of results thereof is adopted (an additional process may be additionally performed for comparison).
5. The association through ZNCC is performed by only the feature point comparison section 186, and an additional process and/or an irregular process is also performed thereby.
6. The association is performed by only the feature point comparison section 186 employing a method other than ZNCC.
7. Two-step processing is performed in which the feature point comparison section 178 first performs the association through ZNCC, and the feature point comparison section 186 then performs a necessary additional process and/or irregular process on the basis of a result thereof.
8. Two-step processing is performed in which the feature point comparison section 186 first performs necessary preprocessing and/or a necessary irregular process, and the feature point comparison section 178 then performs the association through ZNCC on the basis of a result thereof.

The space information acquisition section 180, which includes the CPU 134 and the arithmetic operation unit 148 as mentioned above, is highly programmable through software. Accordingly, when compared to the feature point comparison section 178, the feature point comparison section 186 is characterized in being capable of flexibly performing the additional process and/or the irregular process, such as additional exception handling which is performed only when a particular indicator has exceeded a predetermined value in the association of the feature points, preprocessing for the feature points, a process to be performed in conjunction with the information acquisition section 188, a synchronization process for such processes, a change in the order of the processes, a change in process granularity, and so on.

Accordingly, the capability to select one of the above-listed modes enables the feature point comparison section 186 and the feature point comparison section 178 to singly or together obtain the correspondence information as to the feature points employing a method optimum for the content of the images, a photographing environment, and so on. Note that, as methods of template matching other than ZNCC, SSD (Sum of Squared Difference), SAD (Sum of Absolute Difference), NCC (Normalized Cross Correlation), and so on are commonly known. The feature point comparison section 186 selects one of options including such algorithms in practical use in addition to ZNCC and acquires the correspondence information, and then compares the acquired correspondence information with a result acquired by the feature point comparison section 178 as necessary to optimize the correspondence information as to the feature points.

Note that an inference model using deep learning may be included in the space information acquisition section 180. In this case, the feature point comparison section 186 may use the inference model to, for example, screen the feature points outputted from the feature point comparison section 178 in advance, screen associations that have been made through ZNCC, and/or perform association of the feature points without use of ZNCC. In any case, the additional use of the feature point comparison section 186 as described above in the acquisition of the real space information enables the feature point comparison section 178 to be used specifically for highly efficient processing, for which a hard-wired section has an advantage.

Note, however, that the results of the feature point comparison section 178 may be used as they are, with the feature point comparison section 186 omitted. The information acquisition section 188 acquires the space information using the correspondence information as to the feature points thus obtained. In addition, the information acquisition section 188 may integrate the real space information obtained from the positional relations between the feature points with real space information obtained from the measured values by comparing timing of the image capturing by the stereo camera 110 and timing of the measurement by the motion sensor 120 along the same time axis.

For example, the information as to the position and posture of the head-mounted display 100 obtained through SLAM is combined with extrapolation based on the acceleration and angular acceleration measured by the motion sensor 120 at a higher rate. Thus, position and posture information can be acquired on a shorter cycle than a photographing cycle. Results thus obtained can be reflected in the generation of environment maps as well. The information acquisition section 188 writes the acquired real space information to the high-capacity local memory 154, and uses the acquired real space information to acquire real space information from the following captured images. In addition, the information acquisition section 188, for example, stores the real space information in the external memory 152 such that the real space information can be transmitted to the content processing device 200 or the like.

Figure 5:
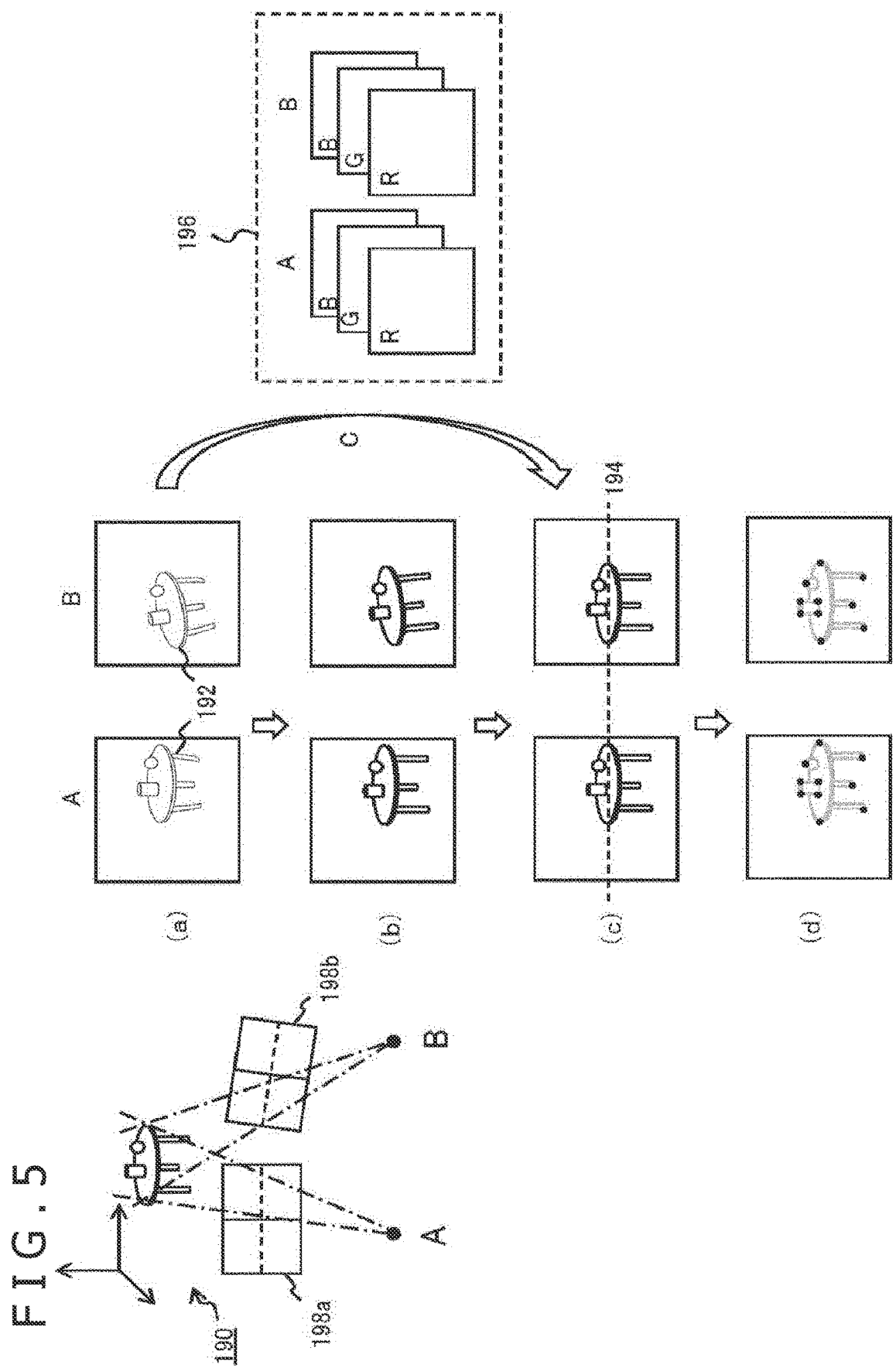
FIG. 5 illustrates diagrams for explaining contents of processing performed on captured images by an image correction section and a feature point extraction section according to the present embodiment.

FIG. 5 illustrates diagrams for explaining contents of processing performed on the captured images by the image correction section 172 and the feature point extraction section 176. In this figure, a schematic diagram of a photographing environment 190 is illustrated on the left side, and images of a table with objects placed thereon captured by the stereo camera 110 from a left point A of view and a right point B of view are to be processed. Note that, as mentioned above, the number of cameras, hence the number of images to be captured and processed in parallel, is not limited to particular values. First, (a) illustrates captured images acquired by the image acquisition section 170, each representing a FIG. 192 of the table.

In more detail, in the image taken from the left point A of view, the FIG. 192 of the table is illustrated more rightward than in the image taken from the right point B of view. In addition, in both the images, the FIG. 192 of the table is distorted in a barrel-type fashion due to the lenses of the camera. Furthermore, as illustrated in the photographing environment 190, a screen 198b for the right point B of view is inclined with respect to a screen 198a for the left point A of view, and thus, the FIG. 192 of the table in the left image is not parallel to the FIG. 192 of the table in the right image.

According to a common technique, correction of removing the distortion due to the lenses is first performed to generate images without distortion as illustrated in (b). Here, on the assumption that a pixel at position coordinates (x, y) in an original image is displaced to position coordinates (x+Δx, y+Δy) in a corrected image by the correction, a displacement vector (Δx, Δy) of this displacement can be given by the following general expressions.

$$\Delta x = (k_1 r^2 + k_2 r^4 + k_3 r^6 + \ldots)(x - c_x)$$

$$\Delta y = (k_1 r^2 + k_2 r^4 + k_3 r^6 + \ldots)(y - c_y) \quad \text{[Math. 2]}$$

Here, r denotes the distance from an optical axis of the lens to the target pixel on the image plane, and (Cx, Cy) denotes the position of the optical axis of the lens. In addition, $k_1$, $k_2$, $k_3$, . . . denote lens distortion coefficients, and depend on the design of the lens. An upper limit of the degree is not limited to particular values. It should be understood that the expressions used for the correction in the present embodiment are not limited to the above expressions.

Next, the rectification is performed on the images with the distortion due to the lenses removed therefrom. Specifically, the images are subjected to a rotational transformation based on camera parameters obtained in advance by calibration to obtain a pair of images having epipolar lines 194 extending in the horizontal direction at the same height as illustrated in (c). Then, a feature point extraction process is performed on the images thus corrected, so that position information as to feature points in each of the images is obtained as illustrated in (d).

As described above, the image correction section 172 according to the present embodiment refers to displacement vector maps 196 to instantaneously generate the images of (c) from the images of (a) (an arrow C) on the partial image-wise basis, each partial image being smaller than one frame. A displacement vector represented in the displacement vector maps 196 has been obtained by combining a displacement vector for the rectification with the displacement vector (Δx, Δy) for removing the distortion due to the lenses described above. As illustrated in the figure, the displacement vector maps are prepared for each of the left point A of view and the right point B of view.

In addition, in the case where captured color images are to be processed, a displacement vector map is prepared for each of the primary colors of red, green, and blue. Thus, the image correction section 172 is able to simultaneously achieve chromatic aberration correction. Furthermore, as described above, in the case where a camera of a rolling shutter type is adopted, the displacement vector map acquisition section 182 updates the displacement vectors in real time on the basis of the values measured by the motion sensor 120, thereby simultaneously correcting distortion caused by motion during a capturing time of one frame. The feature point extraction section 176 extracts feature points from each of the images thus corrected on the partial image-wise basis, employing an algorithm of Harris corner detection or the like.

Figure 6:
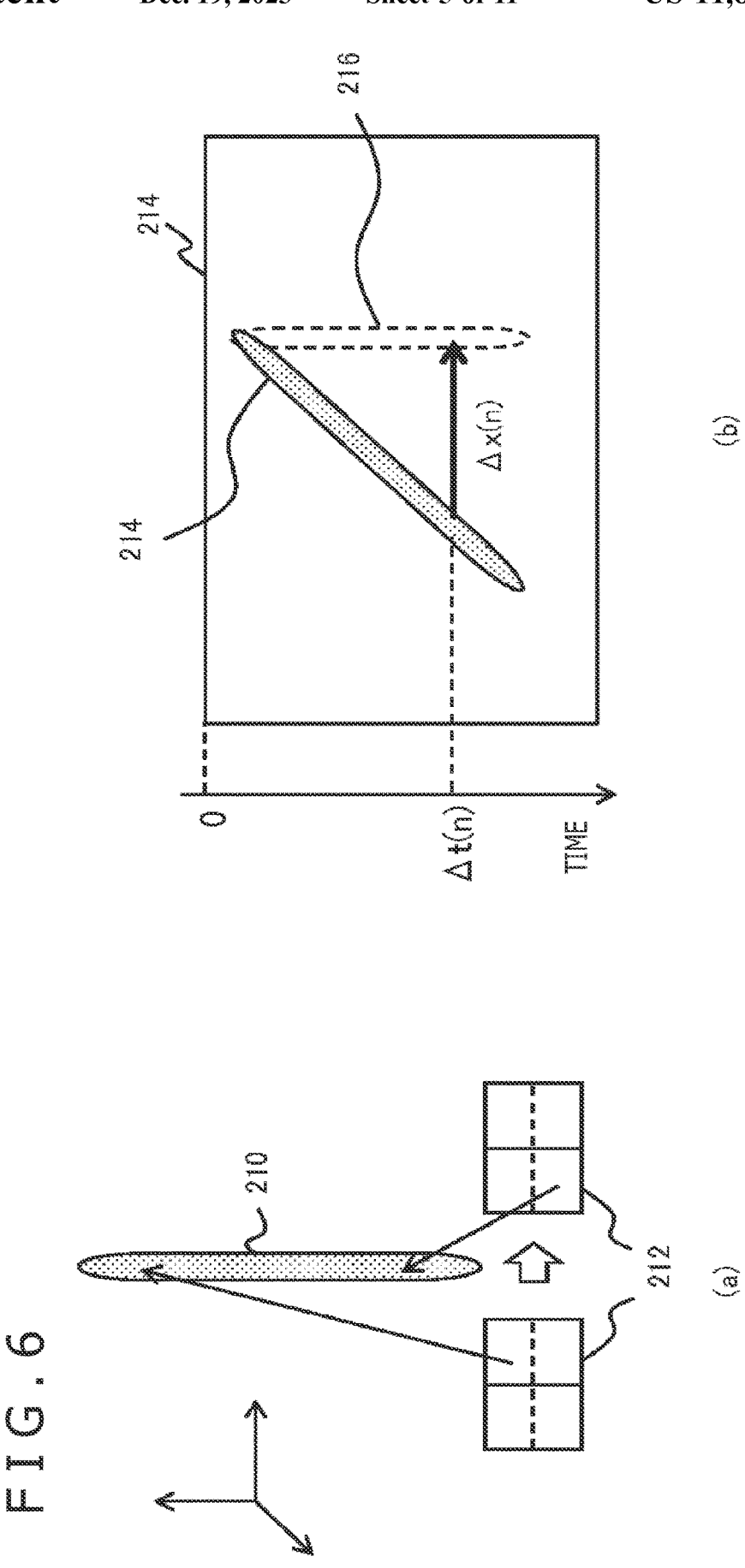
FIG. 6 illustrates diagrams for explaining correction of an image captured by a camera of a rolling shutter type in the present embodiment.

FIG. 6 illustrates diagrams for explaining correction of an image captured by the camera of the rolling shutter type. Here, (a) schematically illustrates a photographing environment assumed in this explanation, and an image of a vertically elongated object 210 is to be captured. It is assumed that the user wearing the head-mounted display 100 has moved during a period in which one frame of the object 210 is captured, so that a screen 212 of the camera has moved from left to right in the figure.

As illustrated in (b), the rolling shutter detects intensities while an image 214 is scanned downward from a top row thereof, and therefore, a figure in an upper part of the image 214 and a figure in a lower part of the image 214 are different in capturing time. As a result, the object 210, which is originally elongated in a vertical direction as illustrated in the figure, is represented as an object obliquely elongated. Needless to say, the manner of distortion varies depending on motion of the camera. Accordingly, the displacement vector map acquisition section 182 derives displacement vectors for correcting this distortion, and combines these displacement vectors with the displacement vectors for the rectification and removing the distortion due to the lens, thereby updating the displacement vector map.

For example, the displacement vector map acquisition section 182 sets a time at which a pixel line in the top row of the frame is scanned as a reference time. A delay time Δt(n) from the reference time to a time at which a pixel line in an nth row is scanned is determined by a frame rate. When a speed v(t), which is a horizontal component of a vector obtained by projecting a velocity vector of the camera derived from the values measured by the motion sensor onto the screen 212, is acquired, a correction amount Δx(n) for pixels in the nth row is calculated as follows.

$$\Delta x(n) = \int_0^{\Delta t(n)} v(t) dt \quad \text{[Math. 3]}$$

Figure 7:
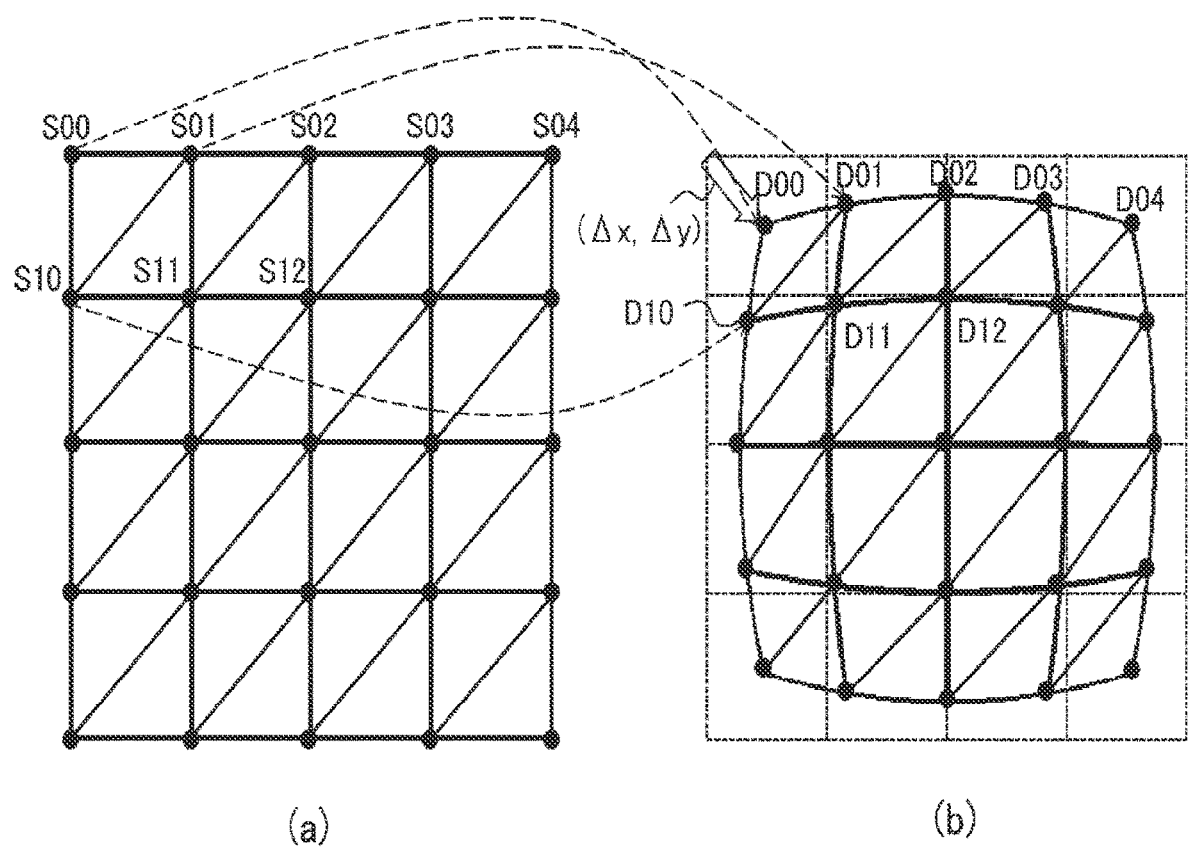
FIG. 7 illustrates diagrams for explaining a procedure example of a correction process performed by a pixel value determination section in the present embodiment.

FIG. 7 illustrates diagrams for explaining a procedure example of a correction process performed by the pixel value determination section 184. Here, (a) illustrates a plane of an image before correction, while (b) illustrates a plane of a corrected image. In the plane of the image before correction, S00, S01, S02 . . . indicate positions at which displacement vectors are set in a displacement vector map. For example, displacement vectors are set discretely (for example, at regular intervals of 8 pixels, 16 pixels, or the like) in a horizontal direction and a vertical direction of the image plane.

In the plane of the corrected image, D00, D01, D02, . . . indicate positions of displacement destinations of S00, S01, S02, . . . , respectively. In the figure, a displacement vector (Δx, Δy) from S00 to D00 is, as an example, represented by a white arrow. The pixel value determination section 184 performs mapping from the image before correction to the corrected image in units of the smallest triangles having pixels at which displacement vectors are set as vertices. For example, a triangle having S00, S01, and S10 as vertices in the image before correction is mapped to a triangle having D00, D01, and D10 as vertices in the corrected image.

Here, pixels inside the triangle are displaced to positions interpolated through, for example, linear, bilinear, or trilinear interpolation according to the distance thereof from each of D00, D01, and D10. Then, the pixel value determination section 184 reads out the values of corresponding pixels in the partial images before correction, which are stored in the connected local memory, to determine pixel values of the corrected image. At this time, the pixel value determination section 184 interpolates the values of a plurality of pixels within a predetermined range relative to the read-out position in the image before correction through, for example, bilinear or trilinear interpolation to derive pixel values of the corrected image. Thus, the pixel value determination section 184 is able to draw the corrected image one pixel line after another sequentially in units of triangles that are displacement destinations of the triangles in the image before correction.

Figure 8:
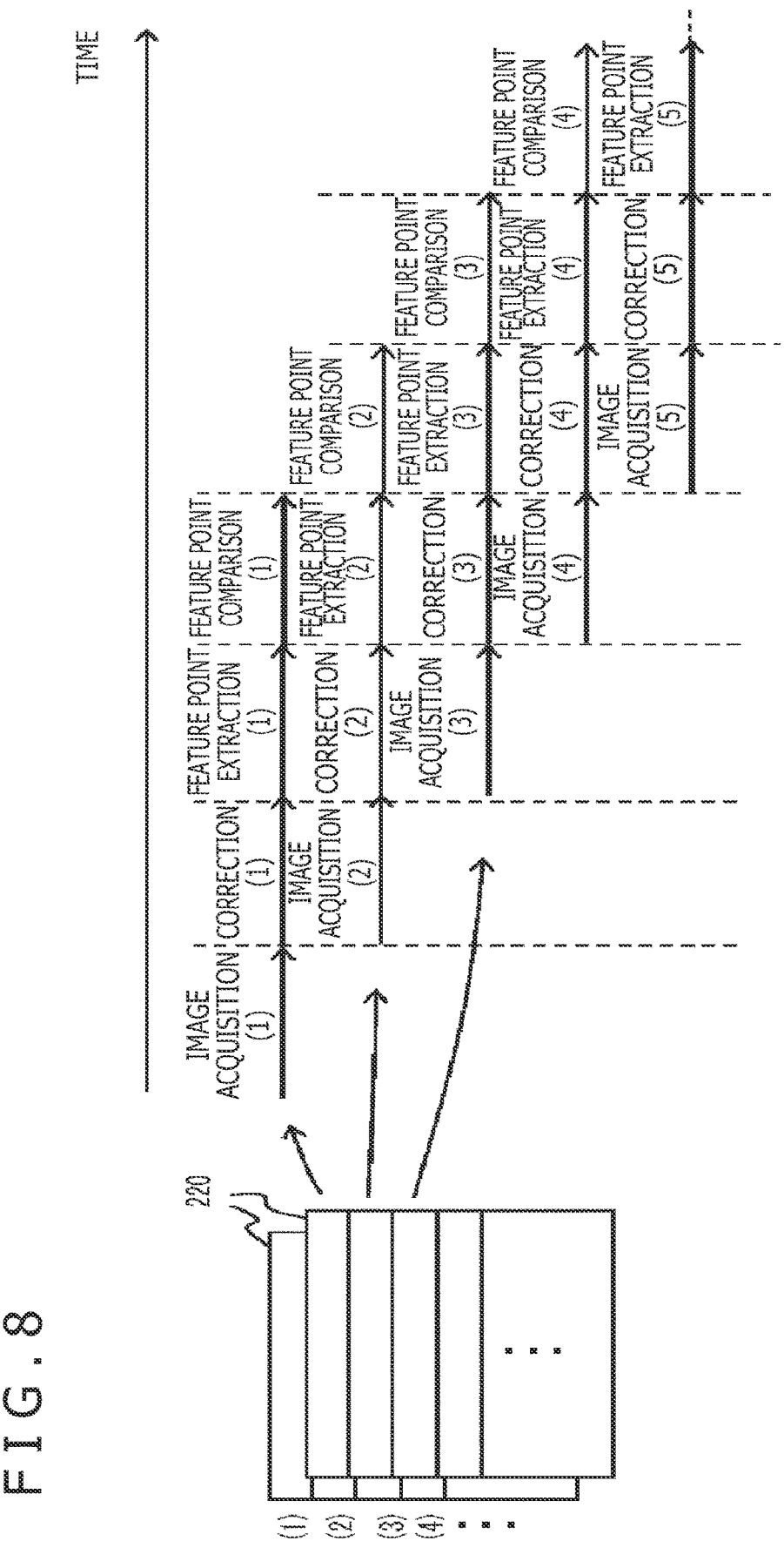
FIG. 8 is a diagram illustrating a flow of a procedure performed by an image acquisition section, the image correction section, the feature point extraction section, and a feature point comparison section in the present embodiment.

FIG. 8 illustrates a flow of a procedure performed by the image acquisition section 170, the image correction section 172, the feature point extraction section 176, and the feature point comparison section 178 in the present embodiment. In the figure, the horizontal direction indicates passage of time, and times of processes performed by the image acquisition section 170, the image correction section 172, the feature point extraction section 176, and the feature point comparison section 178 on the partial image-wise basis are indicated by arrows as "image acquisition," "correction," "feature point extraction," and "feature point comparison." Numbers at ends of the content of the processes indicate numbers of partial images to be processed in ascending order.

In this example, image planes of two captured images 220 to be processed are divided horizontally to generate partial images (1), (2), (3), (4), . . . each having a predetermined number of rows as illustrated on the left side of the figure, but it should be understood that a division rule for the partial images is not limited to this example. First, once the image acquisition section 170 completes acquisition of data of a first partial image of each of the captured images, the image correction section 172 acquires a displacement vector map corresponding to this partial image, and performs correction while referring thereto. During this period, the image acquisition section 170 acquires data of a second partial image of each of the captured images.

Once each of the first partial images is corrected, the feature point extraction section 176 extracts feature points from each partial image. During this period, the image correction section 172 corrects the second partial image of each of the captured images, and the image acquisition section 170 acquires data of a third partial image of each of the captured images. Once the feature points are extracted from each of the first partial images, the feature point comparison section 178 compares the feature points with one another to acquire correspondence relations between the feature points in the first partial images in the two captured images. Further, the feature point comparison section 178 acquires correspondence relations between feature points in this frame and a previous frame captured by the same camera as well.

During this period, the feature point extraction section 176 extracts feature points from the second partial image of each of the captured images, and the image correction section 172 corrects the third partial images. In addition, the image acquisition section 170 acquires data of a fourth partial image of each of the captured images. The processing is thereafter caused to progress in similar manners, so that the correspondence relations between the feature points can be acquired at an increased speed with necessary processes performed in parallel. In the illustrated example, an equal time is allotted to each process for easier understanding, but it should be understood that start timing and end timing of each process are not limited to those of this example.

For example, the image correction section 172 may start the correction process at a time when a pixel line or lines in a range required to determine a pixel line corresponding to one line of the corrected image have been acquired. In addition, the feature point extraction section 176 may start a process of extracting one feature point at a time when a pixel line or lines in a range required to extract this feature point have been acquired. Although it is assumed in the illustrated example that all the processes can be completed within the same regions, such as the first partial images, the second partial images, and so on, the region of the partial image required to start a process may vary depending on the content of the process.

Furthermore, the feature point comparison section 178 performs the association of the feature points in both the space direction and the time direction, and may perform its process on a plurality of images having different resolutions. The order in which such processes are performed, and whether or not such processes are performed in parallel, may be determined as appropriate according to how much of data of a feature point in the search range has been acquired and the time of synchronization with a subsequent process.

Figure 9:
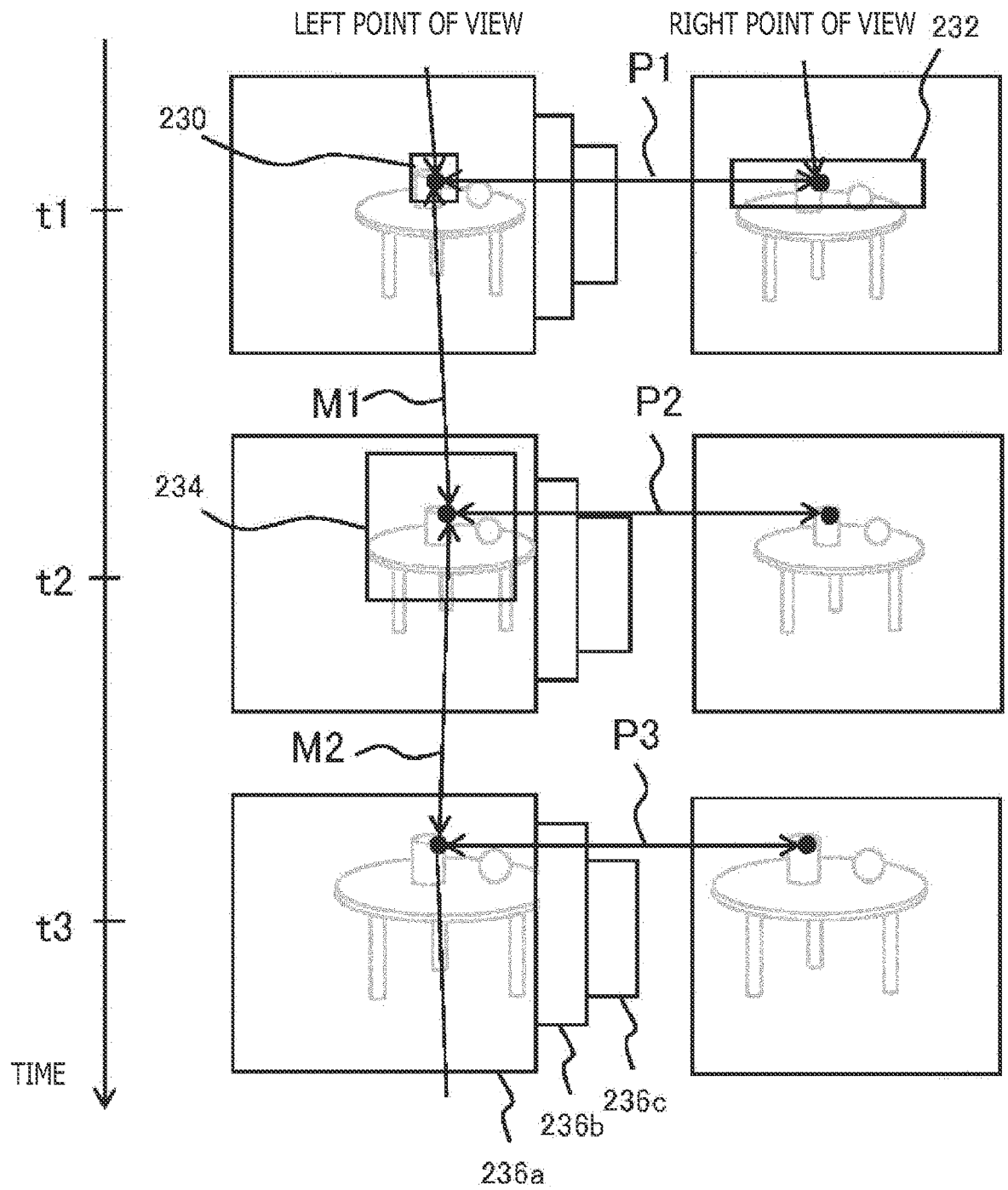
FIG. 9 is a diagram for explaining a procedure of processing in which the feature point comparison section compares feature points with one another in the present embodiment.

FIG. 9 is a diagram for explaining a procedure of processing in which the feature point comparison section 178 compares the feature points with one another. In this figure, images captured by cameras for the left point of view and the right point of view are to be processed as in FIG. 5, but the number of cameras is not limited to particular values. In the figure, the vertical direction indicates passage of time, and images captured by the respective cameras at each of times t1, t2, and t3 are associated with each other. The feature point comparison section 178 acquires pieces of correspondence information (correspondence information in the space direction) P1, P2, P3, . . . as to feature points in different frames captured at the same time by the plurality of cameras, and pieces of correspondence information (correspondence information in the time direction) M1, M2, . . . as to feature points in a plurality of frames captured at different times by the same camera.

When obtaining the correspondence information in the space direction, the feature point comparison section 178, for example, sets a region 230 of a template image having approximately 8×8 pixels for each feature point in the image for the left point of view. Then, the feature point comparison section 178 sets a corresponding search range 232 in the image for the right point of view, and acquires values of ZNCC while shifting a search window having the same size as that of the template image. The feature point comparison section 178 associates a feature point that lies at the same position as that of the region 230 of the template image in the search window for which the greatest value of ZNCC has been obtained with the feature point in the region 230 of the template image. This process is repeated with respect to each of the feature points in the image for the left point of view, so that correspondence relations as to the feature points in the whole image can be obtained.

Here, since the paralleling of the two images has been done through the rectification by the image correction section 172, the search range 232 is limited in area. Accordingly, the feature point comparison section 278 starts the matching process at a time when data of a feature point in the search range (e.g., the search range 232) in the image for the right point of view, the search range corresponding to the region (e.g., the region 230) of the template image set in the image for the left point of view, has been acquired, for example. This enables the associating process to progress in parallel with the processes in previous stages.

The feature point comparison section 178 further acquires the distance to a point of a subject represented as the feature point on the basis of the correspondence relations between the feature points thus obtained. Specifically, the distance is calculated using the principles of triangulation on the basis of a horizontal displacement, on the image plane, between the corresponding feature points in the image for the left point of view and the image for the right point of view. Information as to this distance can be used to identify the position of the subject in a three-dimensional space relative to the stereo camera 110, and to detect an erroneous association between feature points.

Similarly, when obtaining the correspondence information in the time direction, the feature point comparison section 178, for example, sets the region 230 of the template image having approximately 8×8 pixels for each feature point in the image for the left point of view captured at time t1. Then, the feature point comparison section 178 sets a corresponding search range 234 in the image captured at time t2, and acquires values of ZNCC while shifting a search window having the same size as that of the template image. In this case, however, because the direction of displacement of each feature point varies depending on the motion of the user, it is necessary to set a search range that is relatively wide even in the vertical direction of the image plane.

Accordingly, the feature point comparison section 178 may perform preprocessing of reducing the image representing the feature points on the image plane, thereby preparing a plurality of images (e.g., images 236a, 236b, and 236c) having different resolutions to increase efficiency of the searching process. Specifically, the feature point comparison section 178 first performs matching between images having the lowest resolution to acquire rough correspondence relations, then performs matching between images having the next resolution with the search range limited to a region in the vicinity thereof, and so on, thus gradually increasing the degree of precision of the information. Thus, narrowing down of the search range can be accomplished even when large motion has occurred.

Alternatively, the feature point comparison section 178 may predict the motion of the camera by acquiring the values measured by the motion sensor 120. That is, how a feature point will be displaced in a next frame may be predicted on the basis of a velocity vector of the camera in the three-dimensional space. The narrowing down of the search range can be accomplished in this manner as well. The feature point comparison section 178 may perform either both or only one of the narrowing down employing the images having different resolutions and the narrowing down based on the values measured by the motion sensor 120.

In any case, as in the case described above, the feature point comparison section 178 starts the matching process at a time when data as to the search range in the image for the right point of view, the search range corresponding to the template image set in the image for the left point of view has been acquired, for example. This enables the associating process to progress in parallel with the processes in previous stages.

Figure 10:
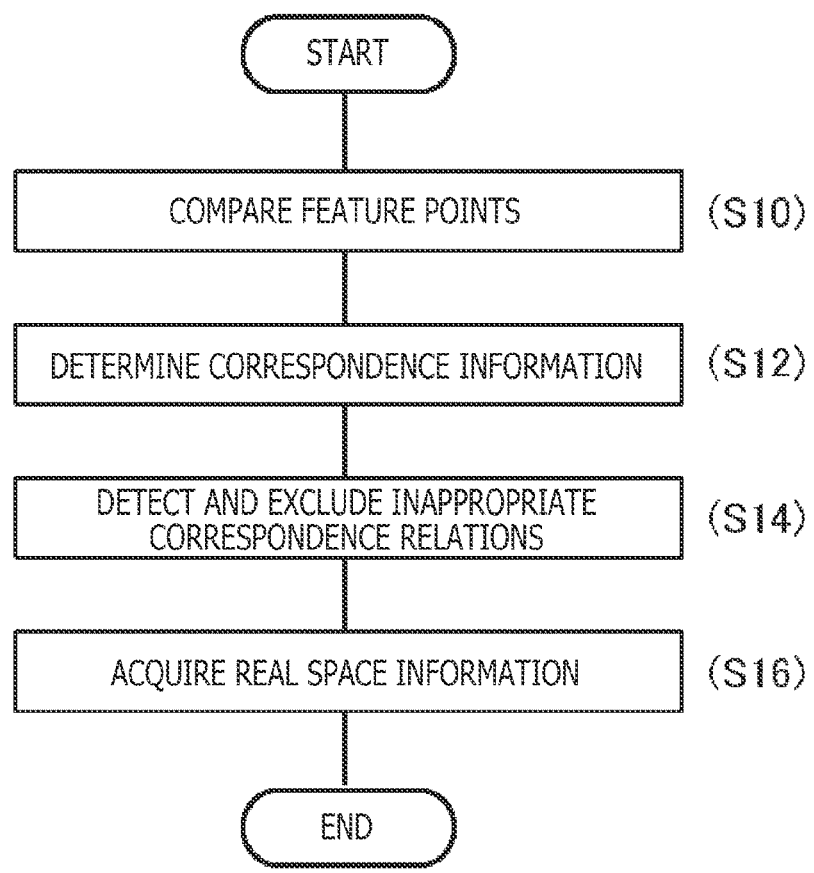
FIG. 10 is a flowchart illustrating a procedure of a real space acquisition process performed by a space information acquisition section in the present embodiment.

FIG. 10 is a flowchart illustrating a procedure of a real space acquisition process performed by the space information acquisition section 180. This flowchart is performed each time correspondence information as to feature points in new captured images (frames) is acquired. First, the feature point comparison section 186 of the space information acquisition section 180 associates feature points in a plurality of captured images with one another on the basis of information as to the feature points extracted by the feature point extraction section 176 (S10). The feature point comparison section 186 basically performs the template matching as illustrated in FIG. 9 to acquire the correspondence information in each of the space direction and the time direction.

At this time, the feature point comparison section 186 performs a process corresponding to one of the above-described modes 1 to 8. For example, the feature point comparison section 186 may perform the association using the same algorithm as the feature point comparison section 178 while images to be processed are divided therebetween, or may perform the association using an algorithm different from the algorithm used by the feature point comparison section 178. In addition, only the feature point comparison section 186 may perform the process, or the feature point comparison section 186 may perform one of preprocessing, an additional process, and an irregular process for the association performed by the feature point comparison section 178. Alternatively, the correspondence information acquired by the feature point comparison section 178 may be used as it is, with the process of S10 omitted.

Next, the feature point comparison section 186 determines the correspondence information to be used finally (S12). That is, in the case where the processes are divided between the feature point comparison section 186 and the feature point comparison section 178, results of the respective processes are integrated. In the case where the association has been performed using an algorithm different from the algorithm used by the feature point comparison section 178, the correspondence information is compared with the correspondence information acquired by the feature point comparison section 178, and the correspondence information that is estimated to have higher accuracy is adopted. In the case where the correspondence information acquired by the feature point comparison section 178 is adopted as it is regardless of whether the feature point comparison section 186 has performed preprocessing, the feature point comparison section 186 reads out this information. In the case where an additional process or an irregular process is performed on the correspondence information acquired by the feature point comparison section 178, the feature point comparison section 186 performs such a process and acquires a result thereof.

The correspondence information obtained here is data representing an association between each of the feature points in the images (e.g., the images for the left point of view) captured by the camera and used as a basis and a set of the correspondence relations P1, P2, P3, . . . in the space direction, the value of the distance to the subject derived therefrom, and the correspondence relations M1, M2, . . . in the time direction as illustrated in FIG. 9. Next, the information acquisition section 188 detects and excludes any erroneous association in the correspondence information as described above (S14). For example, relative positional relations in the real space between a plurality of points represented as feature points on a surface of a subject are not changed by any movement of the camera. Therefore, any correspondence relation that deviates from such a constraint is excluded as an erroneous association from the correspondence information.

It will be understood by those skilled in the art that there are various other conceivable rules for detecting an erroneous association. In addition, the information acquisition section 188 may exclude any data that is inappropriate as a correspondence relation to obtain the real space information as well. The information acquisition section 188 basically acquires the position and posture of the camera in a relative manner using a figure of a subject that does not move as a reference. Therefore, accuracy in the acquisition of the real space information can be increased by excluding a figure of any moving subject from the target of the processing.

For example, the information acquisition section 188 excludes, from the correspondence information, any feature point of an object that is estimated to move, such as a person, an animal, or a robot, on the basis of the color and shape of a figure including any associated feature point. An estimation rule for a moving object may be manually set in advance, or may be optimized by machine learning or deep learning using such a rule as teacher data. Next, the information acquisition section 188 acquires the real space information using the remainder of the correspondence information (S16). For example, a feature point of a figure that should be captured with the estimated position and posture of the camera is compared with a feature point of an actual figure obtained from the correspondence relations in the time direction, and the position and posture that provide a minimum difference therebetween are acquired.

In S16, the information acquisition section 188 may combine information as to the position and posture obtained for a capturing time of the stereo camera 110 with extrapolation based on the values measured by the motion sensor 120 to achieve sensor fusion. In addition, the information acquisition section 188 may generate the environment maps on the basis of the position and posture of the stereo camera 110 acquired in the above-described manner, hence the position and posture of the head-mounted display 100, and the distance to the subject obtained from the correspondence relations in the space direction. As mentioned above, the inference model using deep learning may be included in the space information acquisition section 180. At this time, the information acquisition section 188 may use the inference model when estimating the latest posture and position of the point of view of the camera or generating the environment maps from the associated feature points and the values measured by the motion sensor 120.

Figure 11:
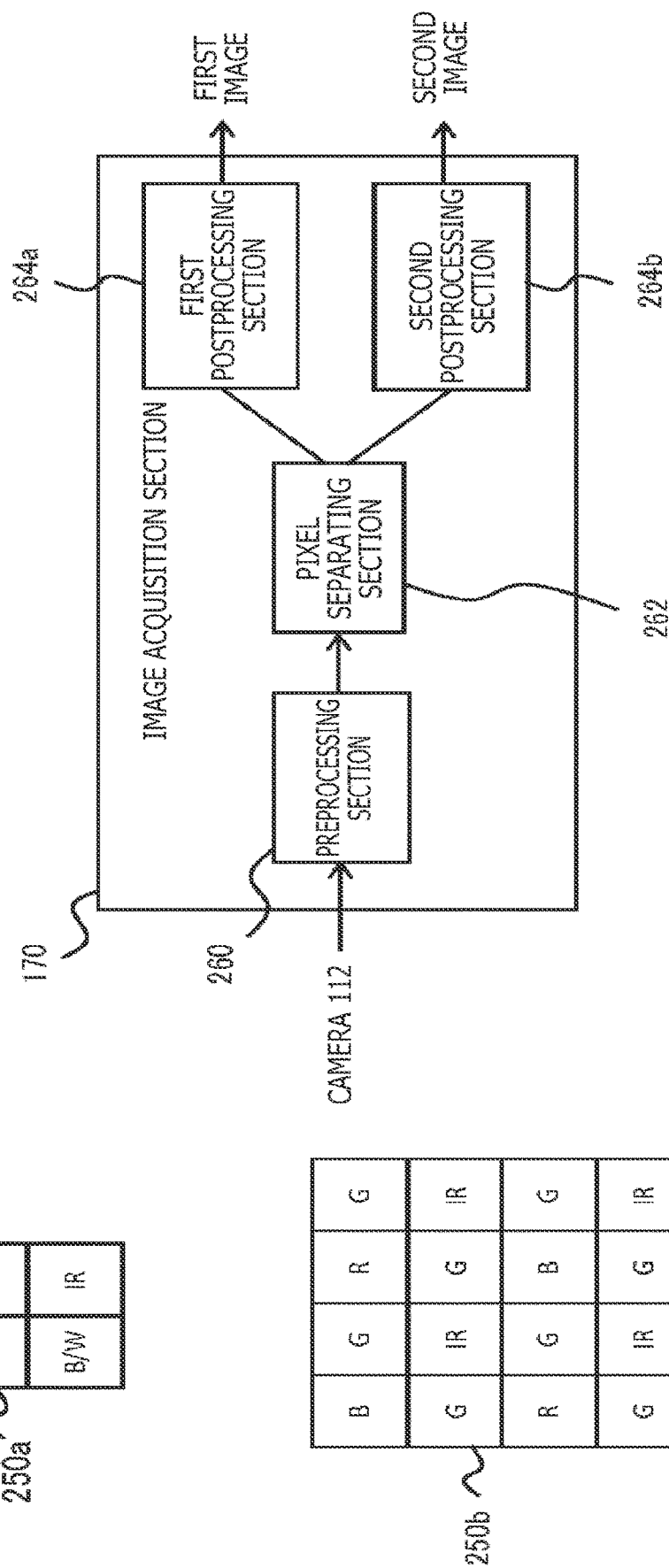
FIG. 11 illustrates diagrams for explaining details of processes of the image acquisition section in the present embodiment.

FIG. 11 illustrates diagrams for explaining details of the processes of the image acquisition section 170. Here, (a) illustrates examples of pixel arrays in the image sensors of the stereo camera 110 or the like. A pixel array 250*a* on the upper side detects grayscale (denoted as "B/W") intensities with three of 2×2 pixels, i.e., four pixels, and detects an infrared (denoted as "IR") intensity with one pixel. Two-dimensional arrays of grayscale intensities and infrared intensities can be obtained by arranging such pixels in both vertical and horizontal directions.

A pixel array 250*b* on the lower side of (a), which has 4×4 pixels, i.e., 16 pixels, detects green (denoted as "G") and infrared (denoted as "IR") intensities with pixels disposed at alternate positions in both the vertical and horizontal directions, and detects red (denoted as "R") and blue (denoted as "B") intensities with pairs of two pixels disposed diagonally out of the remaining four pixels. Two-dimensional arrays of intensities of the three primary colors and infrared intensities can be obtained by arranging such pixels in both the vertical and horizontal directions.

Meanwhile, (b) illustrates detailed functional blocks of the image acquisition section 170. The image acquisition section 170 includes a preprocessing section 260, a pixel separating section 262, a first postprocessing section 264*a*, and a second postprocessing section 264*b*. An input to the image acquisition section 170 is data of captured images including intensities of lights of a plurality of wavelength ranges as pixel values as illustrated in (a). The preprocessing section 260 acquires this data in order of scanning, and performs preprocessing, such as black level correction, defect correction, etc., thereon. The pixel separating section 262 sequentially acquires pieces of data of pixel lines subjected to the preprocessing, and separates the data according to purposes on the basis of the pixel array as illustrated in (a).

In the case of the pixel array 250*a*, for example, the data is separated into the two-dimensional array of grayscale intensities and the two-dimensional array of infrared intensities. In the case of the pixel array 250*b*, the data is separated into the two-dimensional array of red, green, and blue intensities, and the two-dimensional array of infrared intensities. The pixel separating section 262 inputs the separated pieces of data to the first postprocessing section 264*a* and the second postprocessing section 264*b*, respectively, one pixel line after another sequentially. Note that, in the case where the data is separated into three or more pieces of data, as many postprocessing sections as the separated pieces of data are provided. Each of the first postprocessing section 264*a* and the second postprocessing section 264*b* performs postprocessing, such as the demosaicing process, the smoothing process, the noise reduction, the cropping, etc., on the inputted data as necessary.

Thus, pixel values are interpolated as appropriate for pixels the values of which are lacking because of the separation, and pieces of data of a first image and a second image representing the lights of the wavelength ranges that match the purposes are outputted from the first postprocessing section 264*a* and the second postprocessing section 264*b*, respectively. In the case of a camera having the pixel array 250*a*, for example, data of a grayscale image and data of an infrared image are outputted. In the case of a camera having the pixel array 250*b*, data of a color image and data of an infrared image are outputted. In this case, in the present embodiment, the real space information can be obtained as a result of passing data of grayscale images or data of color images to processes in subsequent stages. Note that the pixel array of the image sensor, and the types of wavelength ranges for the separation by the image acquisition section 170, are not limited to the examples described above.

In the present embodiment described above, which concerns a technique for obtaining the real space information from the captured images, before data of pixel lines of one frame is acquired, the processes of image correction, feature point extraction, and feature point comparison are caused to sequentially progress on the partial image-wise basis, each partial image being smaller than the frame. In addition, these processes are implemented by a configuration of a dedicated hard-wired logic and a dedicated data flow. This leads to reducing a delay time from the image capturing by the camera to the acquisition of the real space information, and increased responsiveness of processing. In addition, a reduction in power consumption can be achieved, which leads to an increase in continuous use time even when a rechargeable battery is used for operation.

In addition, in the image correction, displacement vectors that take into account the removal of lens distortion, the rectification, the correction of distortion due to the rolling shutter, etc., are derived, and a displacement vector map representing the displacement vectors on an image plane is referred to to accomplish such corrections at a time. This enables highly accurate information to be obtained with a limited processing load in the processes in the subsequent stages, without an increase in the time required for the correction.

Note that the present embodiment is applicable even in the case of grayscale captured images. In this case, it is not necessary to prepare a different displacement vector map for each of the primary colors in the image correction section 172. Moreover, the amounts of computation and data in the whole series of processes up to the acquisition of the real space information can be reduced, resulting in additional reductions in delay and power consumption. Even in the case where the captured images are color images, similar advantageous effects can be achieved by configuring the image acquisition section 170 to extract only intensity components, and causing the subsequent processes to be performed in a grayscale mode.

In the foregoing, the present invention has been described with reference to embodiments thereof. It should be understood by those skilled in the art that the above embodiments have been described by way of example only, and that various modifications are possible with respect to combinations of components and processes thereof, and such modifications also fall within the scope of the present invention.

For example, in the present embodiment, instead of a general-purpose processor, the configuration of a dedicated hard-wired logic and a dedicated data flow is used to cause the image processing to progress. The acquisition of the real space information can thus be accomplished most effectively with a low delay and a low power consumption, but the series of processes can be accomplished by a general-purpose processor as well. That is, through a computer program loaded into the external memory 152, the CPU may exclusively initiate each process such that pipelining is performed to obtain the real space information with a low delay.

In addition, the present embodiment is applicable even in the case where the captured images are infrared images. In this case, infrared rays may be additionally emitted from an infrared projector to the space to be photographed, or a light source that emits infrared rays may be additionally installed in the space to be photographed. At this time, the rays emitted from the infrared projector may have a structured light pattern. At this time, the feature point extraction section 176 may use this pattern to detect the feature points.

In addition, the processes performed by the space information acquisition section 180 illustrated in FIG. 10 may be performed in units of frames of the captured images. FIG. 12 illustrates an example flow of a procedure, including the processes performed by the space information acquisition section 180, performed on the frames in the image processing apparatus 130. In this figure, as in FIG. 8, the horizontal direction indicates passage of time. As illustrated in a top row, the stereo camera 110 captures pairs of images from the respective points of view in the order of frame 1, frame 2, and so on (S100). In parallel with this, the image acquisition section 170, the image correction section 172, and the feature point extraction section 176 of the image processing apparatus 130 perform image acquisition, correction, and feature point extraction of each frame (S102). That is, as illustrated in FIG. 8, the various processes are caused to progress sequentially on the partial image-wise basis, each partial image being smaller than one frame.

Each time the feature point extraction process for one frame is completed, the space information acquisition section 180 starts the procedure illustrated in FIG. 10 for this frame. That is, first, the feature point comparison section 186 associates the feature points in the plurality of captured images with one another on the basis of the information as to the extracted feature points (S10). Here, as an initial process, the feature point comparison section 186 may acquire the latest feature point distribution using a time-series analysis filter, such as an extended Kalman filter. Next, the feature point comparison section 186 acquires the correspondence information as to the feature points in both the space direction and the time direction.

Note that the processes may be divided such that the correspondence information in the space direction is acquired by the feature point comparison section 178 outside of the space information acquisition section 180, while the correspondence information in the time direction is acquired by the feature point comparison section 186 of the space information acquisition section 180, for example. This enables the acquisition of the correspondence information in the space direction and the acquisition of the correspondence information in the time direction to be performed in parallel as illustrated in the figure, which leads to a shorter time required to obtain both the pieces of information. As described above, there are various other conceivable manners of dividing the processes between the feature point comparison section 178 and the feature point comparison section 186.

When acquiring the correspondence information in the space direction, the feature point comparison section 178 or the feature point comparison section 186 may perform the matching with images having the lowest resolution first followed by images having increasingly higher resolutions, e.g., images with 1/16 size reduction followed by images with 1/4 size reduction and images with no size reduction, thus narrowing down the search range to achieve increased efficiency of the processing. In addition, when acquiring the correspondence information in the time direction, the feature point comparison section 186 may refer to a past frame already stored in the high-capacity local memory 154 as well. When the feature point comparison section 186 is implemented by the arithmetic operation unit 148, and dedicated instructions for executing operations of ZNCC or the like are prepared, the feature point comparison section 186 is able to acquire the correspondence information at a high speed.

Then, the feature point comparison section 186 determines the correspondence information to be used finally on a frame by frame basis on the basis of the correspondence information obtained by the processing of the feature point comparison section 178 and/or the feature point comparison section 186 itself (S12). Then, as described above, the information acquisition section 188 detects and excludes any erroneous association in the correspondence information (S14), and acquires the real space information using the remainder of the correspondence information (S16). Through the above-described procedure, the real space information can be acquired at a high speed and with high accuracy as described above.

INDUSTRIAL APPLICABILITY

As described above, the present invention is applicable to various types of apparatuses, such as an image processing apparatus, a wearable display, a game apparatus, a mobile device, an automobile, a robot, and an unmanned aerial vehicle, a system including such an apparatus, and so on.

REFERENCE SIGNS LIST

100: Head-mounted display
110: Stereo camera
120: Motion sensor
130: Image processing apparatus
134: CPU
136: Image signal processing circuit
138: Local memory
140: Correction circuit
142: Local memory
144: Feature point extractor
146: Feature point comparator
148: Arithmetic operation unit
150: Peripheral device interface
152: External memory
154: High-capacity local memory
170: Image acquisition section
172: Image correction section
174: Sensor information acquisition section
176: Feature point extraction section
178: Feature point comparison section
180: Space information acquisition section
182: Displacement vector map acquisition section
184: Pixel value determination section
186: Feature point comparison section
188: Information acquisition section

The invention claimed is:

1. An image processing apparatus comprising:
an image acquisition section that acquires data of captured images from a camera;
a feature point extraction section that extracts feature points of figures represented in the captured images;
a feature point comparison section that associates feature points of a same figure in a plurality of captured images with each other; and
a space information acquisition section that acquires information as to a real space including the camera on a basis of positional relations between the associated feature points in the captured images,
wherein the feature point extraction section extracts the feature points in each captured image on a partial image-wise basis, a partial image being smaller than a frame of the captured image, and supplies results thereof sequentially to the feature point comparison section, and
wherein the image processing apparatus further comprises at least one of:
(i) an image correction section that performs correction necessary for the extraction of the feature points and the association of the feature points on the captured image on the partial image-wise basis, the partial image being smaller than the frame of the captured image, and supplies results thereof sequentially to the feature point extraction section; and
(ii) a sensor information acquisition section that acquires a measured value from a motion sensor that measures motion of a casing including the camera, wherein the space information acquisition section integrates information obtained from the positional relations between the feature points with information obtained from the measured value by comparing timing of image capturing by the camera and timing of the measurement by the motion sensor along a same time axis to acquire a position and posture of the casing.

2. The image processing apparatus according to claim 1, wherein
the feature point comparison section stores results of the association of the feature points sequentially in a local memory, and
the space information acquisition section reads out the results of the association via an interface directly connected to the local memory.

3. The image processing apparatus according to claim 2, wherein the feature point comparison section sets a search range to search for a feature point corresponding to a feature point in one of the plurality of captured images in another one of the plurality of captured images, and sequentially stores correspondence information as to the feature point obtained as a result of a search in the search range in the local memory.

4. The image processing apparatus according to claim 3, wherein, at a time when data of a feature point in the search range in the other captured image has been obtained, the feature point comparison section starts a process of searching for the corresponding feature point.

5. The image processing apparatus according to claim 1, wherein the feature point comparison section reduces an image to be processed in which feature points are represented, thereby generating a plurality of images having different resolutions, and searches the image having the lowest resolution first followed by the image or images having increasingly higher resolutions, thereby limiting search ranges to perform the association of the feature points.

6. The image processing apparatus according to claim 1, wherein the space information acquisition section optimizes correspondence information as to the feature points in conjunction with the feature point comparison section.

7. The image processing apparatus according to claim 6, wherein the space information acquisition section performs a process of associating the feature points with one another in parallel with the process of the association of the feature points in the feature point comparison section, and obtains final correspondence information as to the feature points by integrating results of these processes, or performs a predetermined process related to the association of the feature points before or after the process of the association of the feature points in the feature point comparison section.

8. The image processing apparatus according to claim 2, wherein each of the image acquisition section, the feature point extraction section, the feature point comparison section, and the space information acquisition section makes access to the local memory via a bus different from a bus to which an external main memory is connected.

9. The image processing apparatus according to claim 1, wherein the feature point comparison section performs one of or both association of feature points in a plurality of images captured at a same time by a plurality of cameras and association of feature points in a plurality of frames of a moving image captured by a same camera.

10. The image processing apparatus according to claim 1, wherein the feature point comparison section employs ZNCC (Zero means Normalized Cross Correlation) to perform the association of the feature points.

11. The image processing apparatus according to claim 1, wherein the image acquisition section performs a predetermined process on the captured image on the partial image-wise basis, the partial image being smaller than the frame of the captured image, and supplies results thereof sequentially to the image correction section.

12. The image processing apparatus according to claim 1, wherein the image acquisition section acquires data of the captured images that includes, as pixel values, intensities of lights of a plurality of wavelength ranges, and separates the data of the captured images according to a plurality of purposes including the acquisition of the information as to the real space, thereby generating pieces of data of a plurality of captured images each having intensities of a light of a predetermined wavelength range as pixel values.

13. The image processing apparatus according to claim 12, wherein the image acquisition section starts the separating process at a time when a pixel line or lines in a range required to determine a pixel line corresponding to one line of the separated captured images have been acquired.

14. The image processing apparatus according to claim 1, wherein the image correction section performs the correction while referring to a displacement vector map representing, on an image plane, displacement vectors each representing an amount and a direction of displacement of a pixel required when correcting the captured image.

15. The image processing apparatus according to claim 14, wherein the image correction section performs correction of removing distortion caused by a lens of the camera and rectification of a plurality of images captured at a same time by a plurality of cameras.

16. The image processing apparatus according to claim 14, wherein the image correction section performs the correction while referring to different ones of the displacement vector maps for different primary colors expressed by the captured image.

17. The image processing apparatus according to claim 14, wherein the image correction section performs, on an image captured by a rolling shutter camera that involves differences in capturing time within a frame, correction of removing distortion of a figure caused by motion of the camera that occurs between different points in time.

18. The image processing apparatus according to claim 17, further comprising:
a sensor information acquisition section that acquires a measured value from a motion sensor that measures motion of a casing including the camera, wherein,
on a basis of the value measured by the motion sensor, the image correction section calculates an amount and a direction of displacement of a pixel required to remove the distortion of the figure caused by the motion of the camera, and combines the calculated amount and direction of displacement with the corresponding displacement vector.

19. The image processing apparatus according to claim 14, wherein the image correction section derives displacement destinations of pixels at discrete positions at which the displacement vectors are set in the displacement vector map, and then derives displacement destinations of intermediate pixels by performing interpolation between the pixels for which the displacement destinations have previously been derived.

20. The image processing apparatus according to claim 14, wherein the image correction section starts the correction process at a time when a pixel line or lines in a range required to determine a pixel line corresponding to one line of a corrected image have been acquired.

21. The image processing apparatus according to claim 1, wherein the feature point extraction section starts a process of extracting one feature point at a time when a pixel line or lines in a range required to extract this feature point have been acquired.

22. A head-mounted display comprising:
an image processing apparatus including:
an image acquisition section that acquires data of captured images from a camera,
a feature point extraction section that extracts feature points of figures represented in the captured images,
a feature point comparison section that associates feature points of a same figure in a plurality of captured images with each other,
a space information acquisition section that acquires information as to a real space including the camera on a basis of positional relations between the associated feature points in the captured images,
the feature point extraction section extracting the feature points in each captured image on a partial image-wise basis, a partial image being smaller than a frame of the captured image, and supplying results thereof sequentially to the feature point comparison section;
the camera that takes the captured images; and
a panel that displays an image generated using the information as to the real space,
wherein the head mounted display further comprises at least one of:
(i) an image correction section that performs correction necessary for the extraction of the feature points and the association of the feature points on the captured image on the partial image-wise basis, the partial image being smaller than the frame of the captured image, and supplies results thereof sequentially to the feature point extraction section; and
(ii) a sensor information acquisition section that acquires a measured value from a motion sensor that measures motion of a casing including the camera, wherein the space information acquisition section integrates information obtained from the positional relations between the feature points with information obtained from the measured value by comparing timing of image capturing by the camera and timing of the measurement by the motion sensor along a same time axis to acquire a position and posture of the casing.

23. A method for acquiring space information using an image processing apparatus, the method comprising:
acquiring data of captured images from a camera;
extracting feature points of figures represented in the captured images;
associating feature points of a same figure in a plurality of captured images with each other;
acquiring information as to a real space including the camera on a basis of positional relations between the associated feature points in the captured images,
wherein, in the extracting the feature points, the feature points in each captured image are extracted on a partial image-wise basis, a partial image being smaller than a frame of the captured image, and results thereof are sequentially used in the associating, and
wherein the method further comprises at least one of:
(i) performing correction necessary for the extraction of the feature points and the association of the feature points on the captured image on the partial image-wise basis, the partial image being smaller than the frame of the captured image, and supplies results thereof sequentially to the feature point extraction section; and
(ii) acquiring a measured value from a motion sensor that measures motion of a casing including the camera, wherein the acquiring includes integrating information obtained from the positional relations between the feature points with information obtained from the measured value by comparing timing of image capturing by the camera and timing of the measurement by the motion sensor along a same time axis to acquire a position and posture of the casing.

24. A non-transitory, computer readable storage medium containing a computer program, which when executed by a computer, causes the computer to perform a method for acquiring space information by carrying out actions, comprising:

acquiring data of captured images from a camera;

extracting feature points of figures represented in the captured images;

associating feature points of a same figure in a plurality of captured images with each other;

acquiring information as to a real space including the camera on a basis of positional relations between the associated feature points in the captured images, wherein the extracting the feature points extracts the feature points in each captured image on a partial image-wise basis, a partial image being smaller than a frame of the captured image, and supplies results thereof sequentially to the associating, and wherein the method further comprises at least one of:

(i) performing correction necessary for the extraction of the feature points and the association of the feature points on the captured image on the partial image-wise basis, the partial image being smaller than the frame of the captured image, and supplies results thereof sequentially to the feature point extraction section; and (ii) acquiring a measured value from a motion sensor that measures motion of a casing including the camera, wherein the acquiring includes integrating information obtained from the positional relations between the feature points with information obtained from the measured value by comparing timing of image capturing by the camera and timing of the measurement by the motion sensor along a same time axis to acquire a position and posture of the casing.

* * * * *